United States Patent
Damnjanovic et al.

(10) Patent No.: US 10,790,949 B2
(45) Date of Patent: Sep. 29, 2020

(54) SRS IN DUAL CONNECTIVITY

(71) Applicant: QUALCOMM Incorporated, San Diego, CA (US)

(72) Inventors: Jelena Damnjanovic, Del Mar, CA (US); Wanshi Chen, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 154 days.

(21) Appl. No.: 14/738,629

(22) Filed: Jun. 12, 2015

(65) Prior Publication Data

US 2015/0372792 A1 Dec. 24, 2015

Related U.S. Application Data

(60) Provisional application No. 62/015,379, filed on Jun. 20, 2014.

(51) Int. Cl.
*H04L 5/00* (2006.01)
*H04W 52/38* (2009.01)
(Continued)

(52) U.S. Cl.
CPC ......... *H04L 5/0048* (2013.01); *H04W 52/346* (2013.01); *H04W 52/367* (2013.01);
(Continued)

(58) Field of Classification Search
None
See application file for complete search history.

(56) References Cited

U.S. PATENT DOCUMENTS 8,873,443 B2 * 10/2014 Haim .................... H04W 52/32
370/311
10,045,248 B2 * 8/2018 Jang .................. H04W 72/0413
(Continued)

FOREIGN PATENT DOCUMENTS

CN     102427608 A    4/2012
CN     102651907 A    8/2012
(Continued)

OTHER PUBLICATIONS

KT Corp., "Uplink Power Control for Dual Connectivity", 3GPP TSG RAN WG1 Meeting #77, Seoul, Korea, May 19-23, 2014 (Year: 2014).*
(Continued)

*Primary Examiner* — Joseph A Bednash
(74) *Attorney, Agent, or Firm* — Holland & Hart LLP

(57) ABSTRACT

Methods, systems, and devices for wireless communication are described. A user equipment (UE) may establish a concurrent connection with different cells from two base stations. During a certain time period, the UE may be power limited for transmissions to the first base station but not for the second base station. In some cases, the UE may then transmit an SRS to the second base station and drop or reduce the power of an SRS transmission to the first base station. In other cases, the UE may determine that a first cell or a second cell is in a power limited state due to scheduled transmissions for the respective cells. In such cases, the UE may drop a scheduled transmission or scale transmission power of the first and second cells by a common value.

29 Claims, 14 Drawing Sheets

(51) Int. Cl.
*H04W 72/02* (2009.01)
*H04W 52/36* (2009.01)
*H04W 52/34* (2009.01)
*H04W 76/15* (2018.01)
*H04W 72/04* (2009.01)
*H04W 84/04* (2009.01)
*H04W 52/14* (2009.01)
*H04W 52/40* (2009.01)

(52) U.S. Cl.
CPC ........... *H04W 52/38* (2013.01); *H04W 72/02* (2013.01); *H04W 76/15* (2018.02); *H04W 52/146* (2013.01); *H04W 52/40* (2013.01); *H04W 72/0473* (2013.01); *H04W 84/045* (2013.01); *Y02D 70/00* (2018.01)

(56) References Cited

U.S. PATENT DOCUMENTS

| | | | | |
|---|---|---|---|---|
| 2010/0246561 | A1* | 9/2010 | Shin | H04W 52/32 370/345 |
| 2010/0311426 | A1* | 12/2010 | Muller | H04W 52/40 455/446 |
| 2011/0281586 | A1* | 11/2011 | Yu | H04W 36/0061 455/436 |
| 2013/0077571 | A1 | 3/2013 | Papasakellariou et al. | |
| 2013/0114505 | A1* | 5/2013 | Haim | H04W 52/146 370/328 |
| 2013/0272229 | A1* | 10/2013 | Dinan | H04W 52/18 370/329 |
| 2014/0105130 | A1* | 4/2014 | Noh | H04W 52/04 370/329 |
| 2015/0319703 | A1 | 11/2015 | Kwon et al. | |

FOREIGN PATENT DOCUMENTS

| | | | | |
|---|---|---|---|---|
| CN | 103167527 A | | 6/2013 | |
| CN | 103621156 A | | 3/2014 | |
| EP | 2739094 A1 | * | 6/2014 | ............ H04W 52/00 |
| EP | 2739094 A1 | | 6/2014 | |
| JP | 2012521173 A | | 9/2012 | |
| WO | WO-2010107880 A3 | | 9/2010 | |
| WO | WO 2013/067430 A1 | * | 5/2013 | ............ H04W 52/14 |
| WO | WO-2013067430 A1 | | 5/2013 | |
| WO | WO-2013073787 A1 | | 5/2013 | |
| WO | WO-2014058257 A1 | | 4/2014 | |

OTHER PUBLICATIONS

Huawei et al., "Draft text proposal on physical layer support of dual connectivity", 3GPP TSG RAN WG1 Meeting #74, Barcelona, Spain, Aug. 19-23, 2013 (Year: 2013).*
LG Electronics et al., WF on Power Control for Dual Connectivity, 3GPP TSG-RAN WG1 #77, Seoul, Korea, May 19-23, 2014, R1-142675 (Year: 2014).*
InterDigital et al., "Way Forward on Power Sharing for Dual Connectivity", 3GPP TSG-RAN WG1 #77, Seoul, Korea, May 19-23, 2014, R1-142589 (Year: 2014).*
ISA/EPO, International Search Report and Written Opinion of the International Searching Authority, Int'l Appl. No. PCT/US2015/036214, dated Dec. 15, 2015, European Patent Office, Rijswijk, NL, 8 pgs.
LG Electronics: "Power Control for Dual Connectivity", R1-141344, 3GPP TSG RAN WG1 Meeting #76bis, Shenzhen, China, Mar. 31-Apr. 4, 2014, 7 Pages, URL: http://www.3gpp.org/ftp/tsg_ran/WG1_RL1/TSGR1_76b/Docs/R1-141344.zip.
HTC: "SRS Transmissions in Multiple TA," R1-124957, 3GPP TSG RAN WG1 Meeting #71, New Orleans, USA, Nov. 12-16, 2012, 3 pages.
Intel Corporation, Discussion on Physical Layer Aspects for Support of Dual Connectivity [online], 3GPP TSG-RAN WG1 #77, R1-142569, May 23, 2014, 6 pages,< url:< a="" href="http://www.3gpp.org/ftp/tsg_ran/WG1_RL1/TSGR1_77/Docs//R1-142569.zip">http://www.3gpp.org/ftp/tsg_ran/WG1_RL1/TSGR1_77/Docs//R1-142569.zip< /url:>.
LG Electronics, Uplink Power Control for Dual Connectivity [online], 3GPP TSG-RAN WG1#77, R1-142141, May 23, 2014, 7 pages,< url:< a="" href="http://www.3gpp.org/ftp/tsg_ran/WG1_RL1/TSGR1_77/Docs//R1- 142141.zip">http://www.3gpp.org/ftp/tsg_ran/WG1_RL1/TSGR1_77/Docs//R1-142141.zip< /url:>.
NTT DOCOMO, Power-control Mechanisms for Dual Connectivity [online], 3GPP TSG-RAN WG1 #77, R1-142264, May 23, 2014, 8 pages,< url:< a="" href="http://www.3gpp.org/ftp/tsg_ran/WG1_RL1/TSGR1_77/Docs//R1-142264.zip">http://www.3gpp.org/ftp/tsg_ran/WG1_RL1/TSGR1_77/Docs//R1-142264.zip< /url:>.

* cited by examiner

SRS IN DUAL CONNECTIVITY

CROSS REFERENCES

The present application for patent claims priority to U.S. Provisional Patent Application No. 62/015,379 by Damnjanovic et al., entitled "SRS in Dual Connectivity," filed Jun. 20, 2014, assigned to the assignee hereof, and expressly incorporated by reference herein.

BACKGROUND

The following relates generally to wireless communication, and more specifically to sounding reference signals (SRS) in dual connectivity. Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, e.g., a Long Term Evolution (LTE) system.

Generally, a wireless multiple-access communications system may include a number of base stations, each simultaneously supporting communication for multiple mobile devices or other user equipment (UE) devices. Base stations may communicate with UEs on downstream and upstream links. Each base station has a coverage range, which may be referred to as the coverage area of the cell. Wireless communication systems may support carrier aggregation, in which several carriers from a common base station are aggregated to serve a UE. Additionally, wireless systems may support dual connectivity, in which a UE simultaneously maintains connections with two base stations on separate carriers.

A UE may transmit sounding reference signals (SRS) to one or more serving base stations to enable the base stations to estimate channel conditions and signal quality for transmissions from the UE. In some cases, SRS transmissions may be dropped or transmitted at a reduced power to ensure that the UE does not exceed carrier, base station, or UE power limitations.

SUMMARY

The described features generally relate to one or more improved systems, methods, and apparatuses for transmitting sounding reference signals (SRS) in dual connectivity scenarios. A user equipment (UE) may establish a concurrent connection with different cells from different base stations. During a certain time period, the UE may be power limited for transmissions to the first base station but not for the second base station. In some cases, the UE may then transmit an SRS to the second base station and drop or reduce the power of an SRS transmission to the first base station. In other cases, the UE may determine that the amount of surplus power (e.g., the difference between the transmit power for scheduled transmissions and a power limitation) is sufficient to overcome a power limitation of the UE with respect to the first base station. The UE may then borrow surplus power to transmit an SRS to the first base station. The surplus power may be power allocated for the second base station, or it may be power that is otherwise unallocated.

A method of wireless communication at a UE is described. The method may include establishing a concurrent connection with a first cell of a first base station and a second cell of a second base station, determining that the UE is in a power limited state for the first cell for a time period, determining that the UE is not in a power limited state for the second cell for the time period, and transmitting an SRS to the second base station on the second cell based at least in part on the determination that the UE is not in the power limited state for the second cell for the time period.

An apparatus for wireless communication at a UE is described. The apparatus may include means for establishing a concurrent connection with a first cell of a first base station and a second cell of a second base station, means for determining that the UE is in a power limited state for the first cell for a time period, means for determining that the UE is not in a power limited state for the second cell for the time period, and means for transmitting an SRS to the second base station on the second cell based at least in part on the determination that the UE is not in a power limited state for the second cell for the time period.

A further apparatus for wireless communication at a UE is described. The apparatus may include a processor, memory in electronic communication with the processor, and instructions stored in the memory. The instructions may be executable by the processor to cause the apparatus to establish a concurrent connection with a first cell of a first base station and a second cell of a second base station, determine that the UE is in a power limited state for the first cell for a time period, determine that the UE is not in a power limited state for the second cell for the time period, and transmit an SRS to the second base station on the second cell based at least in part on the determination that the UE is not in the power limited state for the second cell for the time period.

A non-transitory computer-readable medium storing code for wireless communication at a UE is also described. The code may include instructions executable to establish a concurrent connection with a first cell of a first base station and a second cell of a second base station, determine that the UE is in a power limited state for the first cell for a time period, determine that the UE is not in a power limited state for the second cell for the time period, and transmit an SRS to the second base station on the second cell based at least in part on the determination that the UE is not in a power limited state for the second cell for the time period.

Some examples of the methods, apparatuses, or non-transitory computer-readable media described herein may further include features of, means for, and/or processor-executable instructions for dropping an SRS transmission for the first cell based on the determination that the UE is in the power limited state for the first cell. Some examples include features of, means for, and/or processor-executable instructions for scaling a transmission power for the first cell based on the determination that the UE is in the power limited state for the first cell.

In some examples of the methods, apparatuses, or non-transitory computer-readable media described herein, determining that the UE is in the power limited state includes analyzing overlapping channels for a symbol period, where the symbol period includes or is the time period. Some examples include features of, means for, or processor-executable instructions for deciding whether to borrow surplus power for allocation to the first cell.

Some examples of the methods, apparatuses, or non-transitory computer-readable media described herein may include features of, means for, or processor-executable instructions for determining that an amount of the surplus power is sufficient to overcome the power limited state for the first cell, and transmitting an SRS to the first base station on the first cell in the time period based on the determination that the amount of the surplus power is sufficient to overcome the power limited state for the first cell. Some examples include features of, means for, or processor-executable instructions for determining that an amount of the surplus power is insufficient to overcome the power limited state for the first cell, and dropping or scaling an SRS transmission to the first base station in the time period based on the determination that the amount of the surplus power is insufficient to overcome the power limited state for the first cell.

In some examples of the methods, apparatuses, or non-transitory computer-readable media described herein, the surplus power is initially designated for transmissions to the second base station. In some examples, the surplus power is not designated for transmissions to a particular base station.

In some examples of the methods, apparatuses, or non-transitory computer-readable media described herein, the first cell is in a first timing adjustment group (TAG) and the second cell in a second TAG. In some examples, the first base station is a master base station and the second base station is a secondary base station.

A further method of wireless communication at a UE is described. The method may include establishing a concurrent connection with a first cell of a first base station and a second cell of a second base station, identifying a first scheduled transmission for the first cell during a time period and a second scheduled transmission for the second cell during the time period, and determining that the first cell or the second cell is in a power limited state for the time period based at least in part on the first scheduled transmission or the second scheduled transmission.

A further apparatus for wireless communication at a UE is described. The apparatus may include means for establishing a concurrent connection with a first cell of a first base station and a second cell of a second base station, means for identifying a first scheduled transmission for the first cell during a time period and a second scheduled transmission for the second cell during the time period, and means for determining that the first cell or the second cell is in a power limited state for the time period based at least in part on the first scheduled transmission or the second scheduled transmission.

A further apparatus for wireless communication at a UE is described. The apparatus may include a processor, memory in electronic communication with the processor, and instructions stored in the memory. The instructions may be executable by the processor to cause the apparatus to establish a concurrent connection with a first cell of a first base station and a second cell of a second base station, identify a first scheduled transmission for the first cell during a time period and a second scheduled transmission for the second cell during the time period, and determine that the first cell or the second cell is in a power limited state for the time period based at least in part on the first scheduled transmission or the second scheduled transmission.

A further non-transitory computer-readable medium storing code for wireless communication at a UE described. The code may include instructions executable to establish a concurrent connection with a first cell of a first base station and a second cell of a second base station, identify a first scheduled transmission for the first cell during a time period and a second scheduled transmission for the second cell during the time period, and determine that the first cell or the second cell is in a power limited state for the time period based at least in part on the first scheduled transmission or the second scheduled transmission.

Some examples of the methods, apparatuses, or non-transitory computer-readable media described herein may further include features of, means for, or processor-executable instructions for dropping an SRS transmission based on the power limited state. Some examples include features of, means for, or processor-executable instructions for scaling a transmission power for the first cell and a transmission power for the second cell based on the power limited state, where the transmission power for the first cell and the transmission power for the second cell are scaled by a same value.

In some examples of the methods, apparatuses, or non-transitory computer-readable media described herein, determining that the first cell or the second cell is in the power limited state includes analyzing overlapping channels for a symbol period, and wherein the symbol period comprises the time period. In some examples, the first cell is in a first timing adjustment group (TAG) and the second cell is in a second TAG. In some examples, the first base station is a master base station and the second base station is a secondary base station.

Further scope of the applicability of the described methods, apparatuses, and non-transitory computer-readable media will become apparent from the following detailed description, claims, and drawings. The detailed description and specific examples are given by way of illustration only, since various changes and modifications within the scope of the description will become apparent to those skilled in the art.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

A user equipment (UE) may establish a concurrent connection with different cells from two or more different base stations. In some instances, the base stations may be non-collocated or base stations with non-ideal backhaul connections. During a certain time period, the UE may be power limited for transmissions to the first base station but not for the second base station. In some cases, the UE may then transmit an SRS to the second base station and drop or reduce the power of an SRS transmission to the first base station. In other cases, the UE may determine that the amount of surplus power (e.g., the difference between the transmit power for scheduled transmissions and a power limitation) is sufficient to overcome the power limitation of the first base station. The UE may then borrow surplus power to transmit an SRS to the first base station.

Dual connectivity operation may provide better mobility functionality and capacity gains for a UE compared to single carrier or single base station operation. However, a process for transmitting, dropping, or scaling SRS transmissions based on single carrier or single base station operation may be insufficient for a UE connected to multiple base stations. Thus, the present disclosure describes methods, apparatuses, and systems for configuring SRS with dual connectivity.

The following description provides examples, and is not limiting of the scope, applicability, or configuration set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to certain examples may be combined in other examples.

Figure 1:
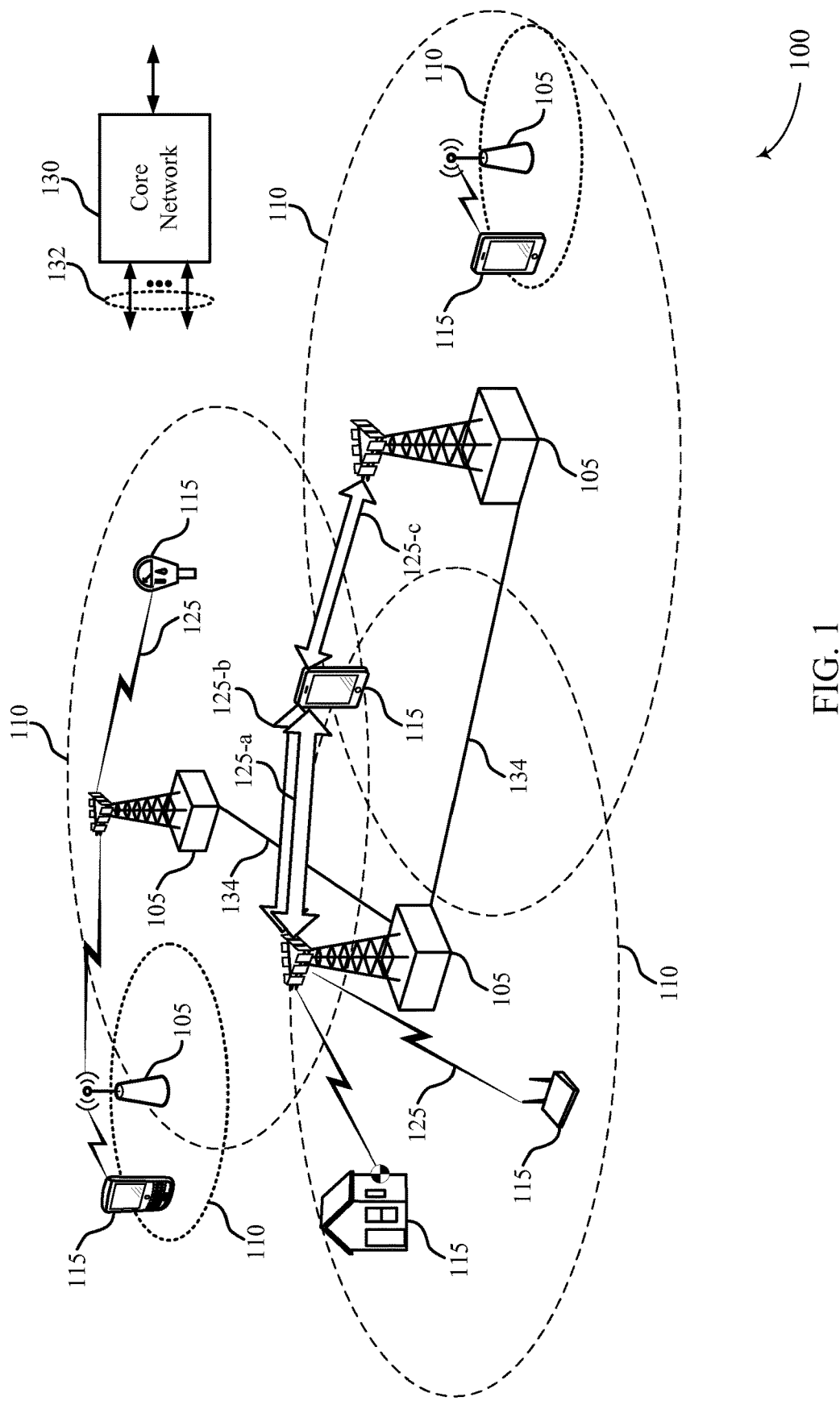
FIG. 1 illustrates an example of a wireless communications system in accordance with the present disclosure.

FIG. 1 illustrates an example of a wireless communications system 100 in accordance with the present disclosure. The system 100 includes base stations 105, communication devices, also known as a user equipment user equipment (UE) 115, and a core network 130. The base stations 105 may communicate with the UEs 115 under the control of a base station controller (not shown), which may be part of the core network 130 or the base stations 105 in various examples. Base stations 105 may communicate control information and/or user data with the core network 130 through backhaul links 132. In some examples, the base stations 105 may communicate, either directly or indirectly, with each other over backhaul links 134, which may be wired or wireless communication links. The system 100 may support operation on multiple carriers (waveform signals of different frequencies, e.g., 125-a, 125-b, and 125-c). The particular combination of carriers may dictate a manner in which a UE 115 performs. As described below, a UE 115 may be served by base stations 105 supporting different cell groups. Wireless communication links 125 may be modulated according to various radio technologies. Each modulated signal may carry control information (e.g., reference signals, control channels, etc.), overhead information, data, etc. The wireless communication links 125 may also be used to transmit SRS from the UEs 115 to the base stations 105.

The base stations 105 may wirelessly communicate with the UEs 115 via one or more base station antennas. Each of the base station 105 sites may provide communication coverage for a respective geographic coverage area 110. This coverage area 110 may be divided into sub-regions known as "cells." Different cells may also be associated with different frequency ranges. In some cases, the cells of a base station 105 may overlap. In some examples, base stations 105 may be referred to as a base transceiver station, a radio base station, an access point, a radio transceiver, a basic service set (BSS), an extended service set (ESS), a NodeB, evolved node B (eNB), Home NodeB, a Home eNodeB, or some other suitable terminology. The coverage area 110 for a base station may be divided into sectors making up only a portion of the coverage area. The system 100 may include base stations 105 of different types (e.g., macro, micro, or pico base stations). There may be overlapping coverage areas for different technologies.

The system 100 may be a Heterogeneous Long Term Evolution (LTE)/LTE-A network in which different types of base stations provide coverage for various geographical regions. For example, each base station 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell.

The core network 130 may communicate with the base stations 105 via a backhaul link 132 (e.g., S1, etc.). The base stations 105 may also communicate with one another, e.g., directly or indirectly via backhaul links 134 (e.g., X2, etc.) or via backhaul links 132 (e.g., through core network 130). The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The UEs 115 may be dispersed throughout the wireless communications system 100, and each UE may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a hand-held device, a tablet computer, a laptop computer, a cordless phone, a wireless local loop (WLL) station, or the like. A UE 115 may be able to communicate with macro eNBs, pico eNBs, femto eNBs, relays, and the like. In some cases, the UEs 115 are configured with a maximum power with which they are allowed to transmit uplink communications within the system 100. The maximum power limitations of a UE 115 may be imposed according to a system operator or they may reflect a physical limitation of the UEs 115, or both.

The communication links 125 shown in system 100 may include uplink (UL) transmissions from a UE 115 to a base station 105 over UL carriers, or downlink (DL) transmissions, from a base station 105 to a UE 115 over DL carriers. The downlink transmissions may also be called forward link transmissions while the uplink transmissions may also be called reverse link transmissions. In some cases, a carrier may be configured for UL and DL transmissions. Additionally or alternatively, each carrier may be configured with a maximum power value with which a UE 115 is allowed to transmit. This maximum power value may be the same or different for each carrier.

A carrier may also be referred to as a component carrier (CC), a layer, a channel, etc. The term "component carrier" may refer to each of the multiple carriers utilized by a UE in carrier aggregation (CA) operation, and may be distinct from other portions of system bandwidth. For instance, a component carrier may be a relatively narrow-bandwidth carrier susceptible of being utilized independently or in combination with other component carriers. Each individual component carrier may provide the same capabilities as, for instance, a single carrier based on release 8 or release 9 of the LTE standard. Multiple component carriers may be aggregated or utilized concurrently to provide some UEs 115 with greater bandwidth and, e.g., higher data rates. Thus, individual component carriers may be backwards compatible with legacy UEs 115 (e.g., UEs 115 implementing LTE release 8 or release 9); while other UEs 115 (e.g., UEs 115 implementing post-release 8/9 LTE versions), may be configured with multiple component carriers in a multi-carrier mode. A carrier used for DL may be referred to as a DL CC, and a carrier used for UL may be referred to as an UL CC. A UE 115 may be configured with multiple DL CCs and one or more UL CCs for carrier aggregation. In an LTE/LTE-A system, CA-capable UEs 115 may utilize or be configured to operate utilizing multiple carriers, while non-CA-capable UEs 115 may operate utilizing a single carrier. Each carrier may be used to transmit control information (e.g., reference signals, control channels, etc.), overhead information, data, etc. A UE 115 may communicate with a single base station 105 utilizing multiple carriers, and may also communicate with multiple base stations simultaneously on different carriers.

A CC may also be referred to as a cell, such that each cell may include an UL CC and a DL CC. Each CC "pair" (e.g., UL CC and DL CC) may be a cell of a base station 105. The coverage area 110 of the serving cells may be different (e.g., CCs on different frequency bands may experience different path loss). In some examples, one carrier is designated as the primary carrier, or primary component carrier (PCC), for a UE 115, which may be served by a primary cell (PCell), composed of an UL PCC and a DL PCC, for example. Primary cells may be semi-statically configured by higher layers (e.g., radio resource control (RRC), etc.) on a per-UE basis. Certain uplink control information (UCI), e.g., acknowledgement (ACK)/negative ACK (HACK), channel quality indicator (CQI), and scheduling information transmitted on physical uplink control channel (PUCCH), are carried by the primary cell. Additional carriers may be designated as secondary carriers, or secondary component carriers (SCC), which may be served by secondary cells (SCells). Secondary cells may likewise be semi-statically configured on a per-UE basis. In some cases, secondary cells may not include or be configured to transmit the same control information as the primary cell.

In some cases, a UE 115 may be connected over multiple carriers (e.g., communication links 125-a and 125-b) with a single base station 105. In other cases, (e.g., including communications link 125-c) a UE 115 may transmit and receive data from multiple carriers from different base stations 105. If the backhaul link 134 is non-ideal (e.g., there is a lag in communication between the base stations 105), it may be difficult or the system may not be able to support carrier aggregation in a similar manner as when backhaul is ideal (e.g., with limited communication lag) or when CCs or cells are associated with a common base station. Procedures for a UE 115 to connect with two base stations 105 that have a non-ideal backhaul link 134 may be referred to as dual connectivity procedures. In dual connectivity operation, a UE may determine whether to transmit, drop, or scale SRS transmissions for each base station independently. In other cases, the UE 115 may select an SRS configuration that applies to transmissions to both base stations 105.

Figure 2:
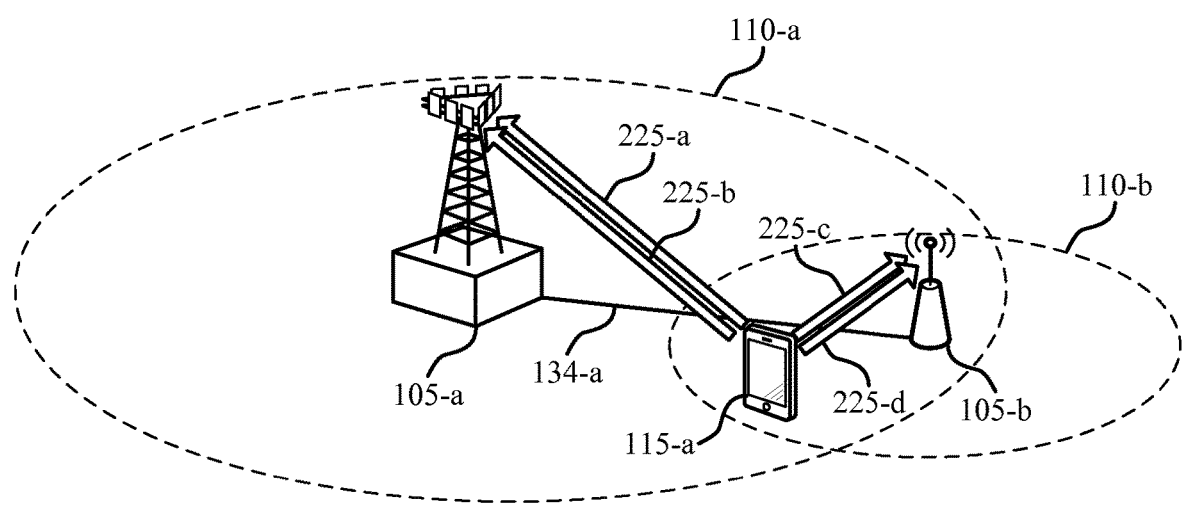
FIG. 2 illustrates an example of a wireless communication system that supports SRS in dual connectivity in accordance with the present disclosure.

FIG. 2 illustrates an example of a wireless communication system 200 configured for transmitting or prioritizing sounding reference signal (SRS) transmissions for a UE 115 in a dual connectivity scenario in accordance with the present disclosure. The system 200 may be an example of aspects of the system 100 of FIG. 1. The system 200 includes a base station 105-a, which may be associated with a set of carriers known as a master cell group (MCG), and a base station 105-b, which may be associated with a set of carriers known as a secondary cell group (SCG). The base station 105-a may, for instance, be a LTE macro cell, while the base station 105-b may be a small cell (e.g., a femto cell or a pico cell). In other cases, both base stations 105 may be macro cells. Each of the base stations 105 may have an independent scheduler (not shown); and each base station 105 may have a respective coverage area 110-a and 110-b. An MCG may be a cell group (also referred to as a carrier group) that includes a primary cell (e.g., PCC, PCell, etc.); and an SCG may be a cell group that does not include a PCell, but which may be configured with a physical uplink control channel (PUCCH)-enabled SCell (e.g., a special SCell or PSCell). Those skilled in the art will recognize that, in some cases, a special SCell may provide more PCell-like lower layer functionality than other SCells. The timing of carriers within each group may be synchronized according to one or more groups known as timing adjustment groups (TAG). For instance, each carrier within an MCG (e.g., carriers 225-a and 225-*b*) may be in the same TAG; and each carrier within an SCG (e.g., carriers 225-*c* and 225-*d*) may be in a different TAG. Carriers of the MCG may not be synchronized with respect to carriers of the SCG. Carriers within a common TAG may share a common uplink timing or timing advance mechanism, or both.

The base stations 105-*a*, 105-*b* may be in communication with one another via a non-ideal backhaul link 134-*a*. So, while a UE 115-*a* in a connected mode may consume radio resources from both the master and secondary cell groups, there may be no requirement that the base stations 105 maintain synchronization between their collective cells or cell groups. This may be distinct from carrier aggregation operation in which synchronization may be maintained among the cells of a particular base station. The existence of a non-ideal backhaul and separate schedulers may have other effects as well. For example, a non-ideal backhaul may result in the use of different RRC configurations for the cells of the MCG (e.g., carriers associated with the base station 105-*a*) and the SCG (e.g., carriers associated with the base station 105-*b*). A non-ideal backhaul may also impact the ability of one base station 105 serving a dual-connectivity UE 115-*a* to accommodate the operation of another base station 105 serving the dual-connectivity UE 115-*a* (e.g., by providing control information or scheduling information to the UE for both base stations 105).

Thus, UE 115-*a* may establish a concurrent connection with at least a first cell (e.g., carrier 225-*a*) of a first base station, such as base station 105-*a*, and a second cell (e.g., carrier 225-*c*) of a second base station, such as base station 105-*b*. The UE 115-*a* may be in a power limited state for the first cell for a time period. The UE 115-*a* may not be in a power limited state for the second cell for the time period. For example, a power limited state may relate to transmission power for a carrier being limited by the associated base station. This limit may be known as $P_{CMAX,c}$, where c is the index of the carrier. In some cases, the sum of the $P_{CMAX}$ values may exceed the maximum transmit power of the terminal, $P_{TMAX}$, e.g., because UE 115-*a* may not transmit on every carrier at the same time. The power for transmission of different data channels, e.g., the physical uplink control channel (PUCCH) transmission power, $P_{PUCCH,c}$, and the physical uplink shared channel (PUSCH) transmission power, $P_{PUSCH,c}$, may be initially determined by independent algorithms. However, the transmission power for each carrier with index c may be limited to $P_{CMAX,c}$, and the total transmission power for all carriers may be limited to $P_{TMAX}$.

If the transmission power for the one or more channels, e.g., $P_{PUCCH}$, and $P_{PUSCH}$, exceeds either $P_{CMAX}$ or $P_{TMAX}$, UE 115-*a* may be in a power limited state. In some cases, UE 115-*a* may be in a power limited state with respect to UL transmissions to a base station (e.g., base station 105-*a*). In some cases a UE 115-*a* may be in a power limited state with respect to UL transmissions to one base station (e.g., base station 105-*a*) but not for transmissions to another base station (e.g., 105-*b*). The status of power limitations may impact whether UE 115-*a* transmits an SRS.

An SRS may be transmitted by UE 115-*a* using a predetermined sequence (e.g., a Zadoff-Chu sequence), allowing a base station 105 to estimate the UL channel quality. An SRS transmission may not be associated with transmission of data on another channel, and may be transmitted periodically on a wide bandwidth (e.g., a bandwidth including more subcarriers than are allocated for UL data transmission). An SRS may also be scheduled on multiple antenna ports and may still be considered a single SRS transmission. An SRS transmission may be categorized as a Type 0 (periodically transmitted at equally spaced intervals) SRS or as a Type 1 (aperiodic) SRS. Thus, data gathered by a base station 105 from an SRS may be used to inform an UL scheduler. A base station 105 may also utilize an SRS to check timing alignment status and send time alignment commands to the UE 115-*a*. In some cases, transmission of an SRS on one cell may interfere with or utilize transmission power of other UL transmissions on another cell. Thus, UE 115-*a* may utilize an algorithm for deciding an SRS configuration (e.g., rules for when to transmit, drop or reduce the transmit power of the SRS transmissions) on the one or more cells supported by a base station 105. In some cases, the SRS configuration for each base station 105 may be determined independently of the SRS configuration for other base stations 105.

In one example SRS configuration (e.g., in LTE release 10), only one SRS transmission may be transmitted by UE 115-*a* on the same cell in the same UL transmission symbol period (e.g., an SC-FDMA symbol) in the same subframe. Type 1 transmissions (aperiodic SRS) may be prioritized over Type 0 (periodic SRS). If a PUCCH transmission is scheduled on one cell and an SRS on another cell during a subframe, the UE may transmit the SRS on the SCell if the PUCCH format is shortened on the PCell, and drop the SRS if the PUCCH is in a standard format on the PCell. If a PUSCH transmission is scheduled, UE 115-*a* may rate match the PUSCH transmission in any cell-specific SRS subframe configured on the same cell. UE 115-*a* may drop an SRS if PUSCH is transmitted in the same symbol on a different cell. UE 115-*a* may transmit more than one SRS during the same symbol period on different cells.

In another SRS configuration (e.g., in LTE release 11), UE 115-*a* configured with a single TAG may not transmit an SRS if the SRS and a PUSCH transmission overlap in the same symbol. IF UE 115-*a* is configured with multiple TAGs, the following configuration may apply. If SRS and a PUSCH or PUCCH are scheduled during the same symbol period on different TAGs, UE 115-*a* may transmit the SRS if it is not power limited and drop the SRS if it is power limited. If two SRS transmissions are scheduled in the same symbol period, UE 115-*a* may transmit both when not power limited and apply equal power scaling such that no Pcmax value is exceeded if power limited. Scaling may include reducing power used for transmitting an SRS, while maintaining full power for other channel transmissions. If two SRS transmissions on different cells conflict with a PUCCH or PUSCH transmission on a third cell (and the transmissions are spread across different TAGs), UE 115-*a* may drop all SRS transmissions before doing any other power scaling (e.g., to PUCCH or PUSCH) such that no Pcmax value is exceeded, if UE 115-*a* is power limited. If UE 115-*a* is not power limited, however, it may transmit both SRSs. When configured with multiple TAGs, the last symbol of the PUSCH transmission may be rate matched if the UE 115-*a* is configured to transmit a periodic SRS in the subframe in the same cell, regardless of whether the SRS is dropped due to power limitation.

As an example of SRS transmission with dual connectivity, UE 115-*a* may transmit an SRS to the second base station 105-*b* on the second cell 225-*c* based at least in part on a determination that the UE 115-*a* is not in a power limited state for the second cell (or carrier) 225-*c*, and drop an SRS transmission for the first cell (or carrier) 225-*a* based on a determination that the UE 115-*a* is in power limited state on the first cell 225-*a*. In another example, UE 115-*a* may scale a transmission power (e.g., an SRS or another transmission) for the first cell 225-*a* based on the determination that the UE 115-*a* is in a power limited state on the first cell 225-*a*.

In some cases, UE 115-*a* may scale a transmission power (e.g., an SRS or another transmission) for the second cell 225-*c* based on the determination that the UE 115-*a* is in a power limited state on the second cell 225-*c*. Determining that the first cell 225-*a* or the second cell 225-*c* is in a power limited state may be based on a scheduled transmission for the first cell 225-*a* or a scheduled transmission for the second cell 225-*c*. The scheduled transmissions may be scheduled for the same time period. In some examples, determining that the UE 115-*a* is in a power limited state for the first cell 225-*a* or the second cell 225-*c* may include analyzing overlapping channels (e.g., PUCCH and PUSCH) for the symbol period. The symbol period may include the time period for the scheduled transmissions. In some cases, the first base station 105-*a* and the second base station 105-*b* are in different TAGs.

In another example, UE 115-*a* may determine an SRS transmission configuration (e.g., transmission, dropping and scaling rules) uniformly for all base stations 105 that UE 115-*a* is connected to. For example, UE 115-*a* may determine a single power limitation status for all carriers, and transmit, drop, or scale SRS transmissions based on the single power limitation status.

Figure 3A:
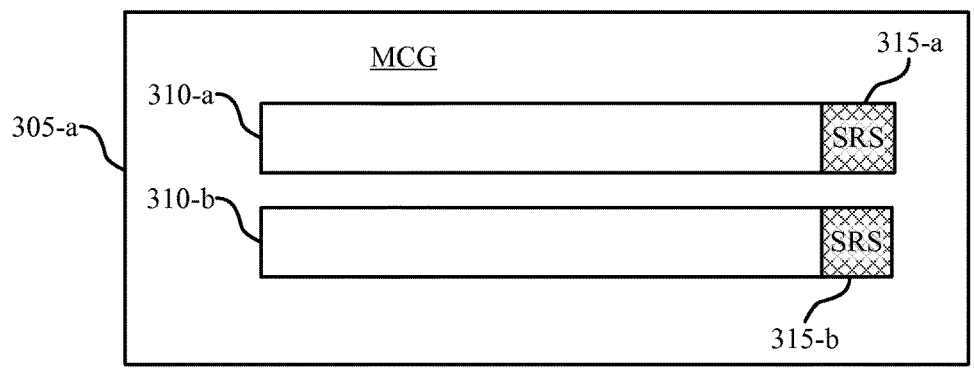
FIG. 3A illustrates an example diagram of synchronous SRS timing in dual connectivity in accordance with the present disclosure.
Figure 3A:
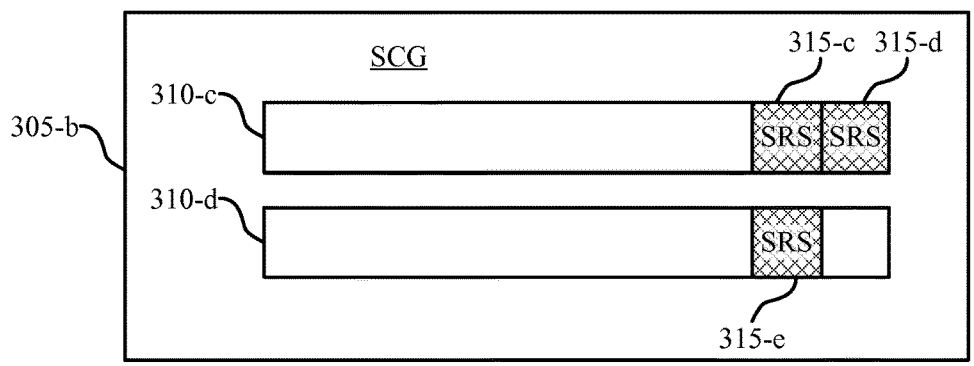

FIG. 3A illustrates an example diagram 301 of synchronous SRS timing in a dual connectivity scenario in accordance with the present disclosure. Diagram 301 may represent UL cells for a UE 115 (FIGS. 1 and 2) grouped into an MCG 305-*a* and an SCG 305-*b*. MCG 305-*a* may include two cells, 310-*a* and 310-*b*, represented for the time period of one subframe, used for UL transmissions to a first base station 105 (FIGS. 1 and 2). SCG 305-*b* may include two cells, 310-*c* and 310-*d*, used for UL transmissions to a second base station 105 (FIGS. 1 and 2). In this example, periodic SRS transmissions may be synchronized between MCG 305-*a* and SCG 305-*b*. Thus, periodic SRS transmissions 315-*a* and 315-*b* may be transmitted in the last symbol period (e.g., in an UL pilot time slot (UpPTS) in time division duplexing TDD operation) for MCG 305-*a*, while periodic SRS transmissions 315-*c* and 315-*e* are scheduled in the second to last slot for SCG 305-*b*.

Figure 3B:
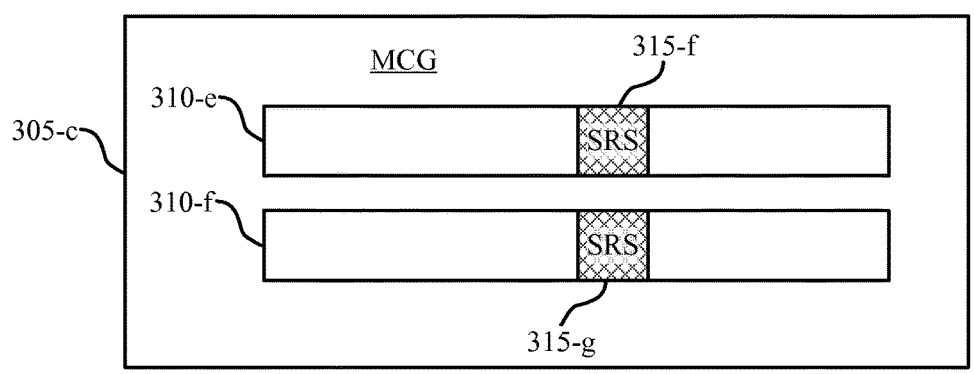
FIG. 3B illustrates an example diagram of asynchronous SRS timing in dual connectivity in accordance with the present disclosure.
Figure 3B:
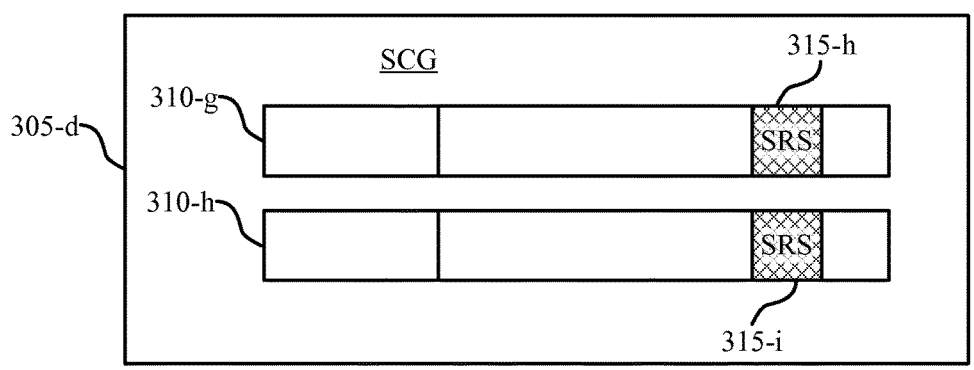

While SRS collisions may not always be expected to simultaneously occur across cell groups during asynchronous operation (e.g., as depicted in FIG. 3B), even in synchronous operation, an SRS collision may not occur across cell groups as depicted in FIG. 3A. Accordingly, SRS power scaling or dropping may be accomplished on a per symbol basis based on the actual channel overlap in a particular symbol (e.g., SRS, PUCCH, or PUSCH overlap). For example, SRS 315-*d* represents an aperiodic SRS transmitted in the last symbol slot on cell 310-*c*. Thus, if for example, the UE 115 is power limited for transmissions over MCG 305-*a*, the power for SRS transmissions 315-*a* and 315-*b* may be reduced. At the same time, if the UE 115 is not power limited for transmissions over SCG 305-*b*, SRS 315-*d* may be transmitted without power scaling. Further, SRS transmissions 315-*c* and 315-*e*, which are transmitted in a different symbol period, may be transmitted, dropped or power scaled independently of SRS transmissions 315-*a*, 315-*b*, and 315-*d*. In other words, the SRS collisions of SRS transmissions 315-*a*, 315-*b*, and 315-*d* do not simultaneously occur across cell groups with SRS transmissions 315-*c* and 315-*e*. Accordingly, a power limitation determination, including whether to drop SRS or to scale SRS transmission, may be performed on a per symbol basis, such as based on actual channel overlap in a particular symbol.

FIG. 3B illustrates an example diagram 302 of asynchronous SRS timing in a dual connectivity scenario in accordance with the present disclosure, and various examples in which SRS transmissions may be misaligned across cell groups. Diagram 302 may represent UL cells for a UE 115 (FIGS. 1 and 2) grouped into an MCG 305-*c* and an SCG 305-*d*. MCG 305-*c* may include two cells, 310-*e* and 310-*e*, represented for the time period of one subframe and used for UL transmissions to a first base station 105 (FIGS. 1 and 2). SCG 305-*d* may include two cells, 310-*g* and 310-*h*, used for UL transmissions to a second base station 105 (FIGS. 1 and 2). A time period of one subframe is also represented for SCG 305-*d*, but SCG 305-*d* may not be synchronized with MCG 305-*c*. The subframes may therefore not begin at the same time. Thus, even if periodic SRS transmissions 315-*f* and 315-*g* may be transmitted in the same symbol period (relative to the beginning of the subframe) for MCG 305-*c* as periodic SRS transmissions 315-*h* and 315-*i* for SCG 305-*d*, they may not be transmitted at the same time. Accordingly, the SRS configuration may be calculated on a per symbol basis—e.g., calculated based on whether there is an actual overlap of SRS transmissions or an actual overlap of SRS with other channel transmissions during each interval lasting one symbol period.

Figure 4A:
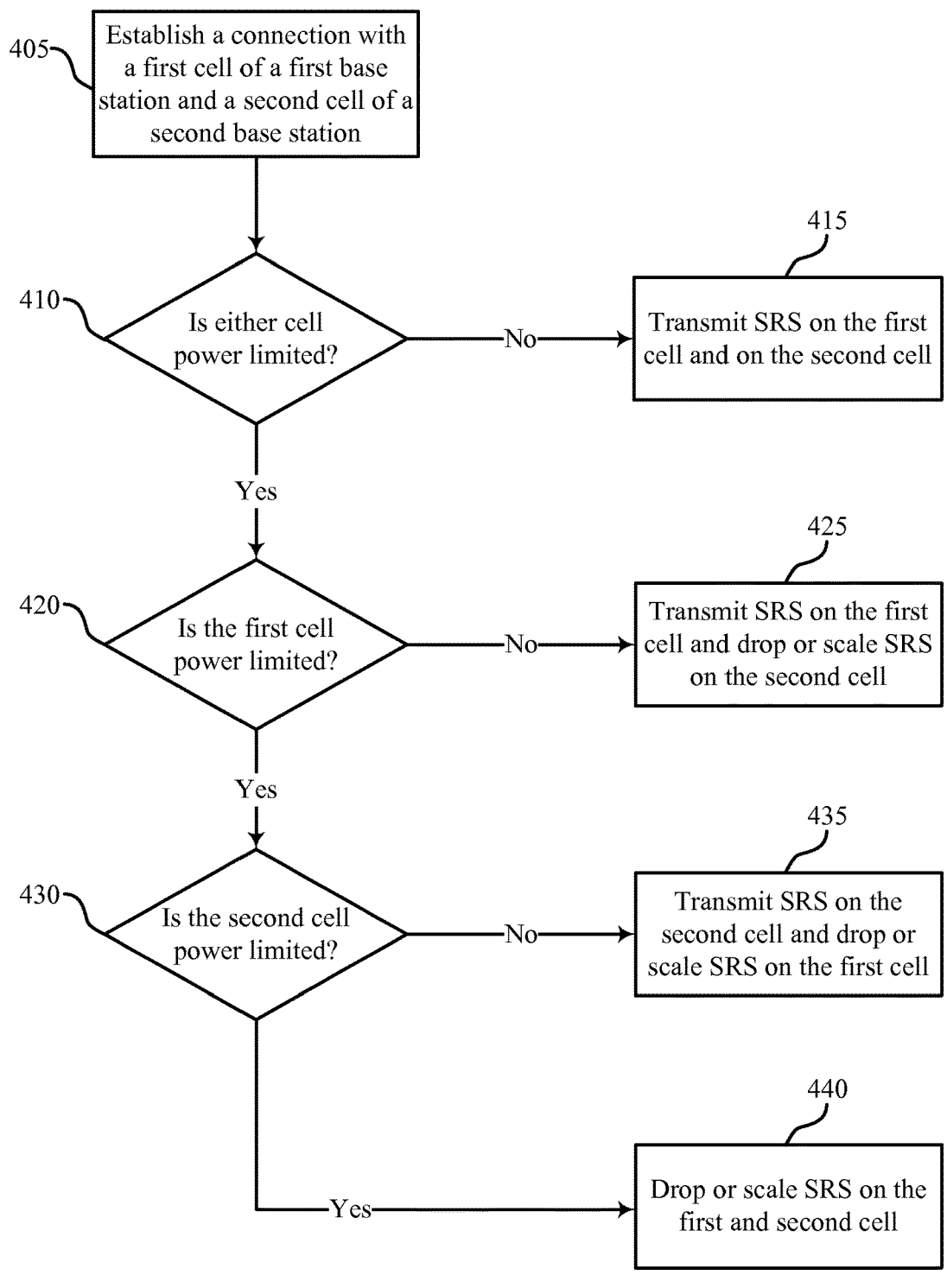
FIG. 4A shows a flowchart illustrating an example of a method for transmitting or prioritizing SRS in a dual connectivity scenario, in accordance with the present disclosure.

FIG. 4A shows a flowchart illustrating an example of a method of wireless communication 401 for transmitting or prioritizing SRS transmissions in a dual connectivity scenario in accordance with the present disclosure. FIG. 4A may illustrate an example of how SRS transmission, dropping, or scaling may be done independently for cells associated with different base stations 105 (FIGS. 1 and 2). At block 405, a UE 115 (FIGS. 1 and 2) may establish a connection with a first cell of a first base station 105 and a second cell of a second base station 105 using dual connectivity procedures. At block 410, the UE 115 may determine whether it is power limited on any of the cells (e.g., towards one or more base stations). If not, at block 415, UE 115 may select an SRS configuration in which an SRS may be transmitted on the first cell and on the second cell. However, even if UE 115 is not power limited on any cell, in some cases an SRS may not be scheduled. Thus, an SRS may be transmitted if it is scheduled.

If a UE 115 is power limited with respect to at least one cell, at block 420 UE 115 may determine whether it is power limited for the first cell. In some cases, the UE 115 may be power limited for the first cell based on a power limitation for transmissions to the first base station 105. If not, the UE 115 may be power limited for the second cell and at block 425 the UE 115 may select an SRS configuration in which SRS may be transmitted on the first cell and an independent SRS configuration may be selected for the second cell, based on which an SRS transmission may be dropped or scaled.

If a UE 115 is power limited with respect to a first cell, at block 430 the UE 115 may determine whether the second cell is also power limited. If the second cell is not power limited, at block 435 the UE 115 may select an SRS configuration in which SRS may be transmitted on the second cell and an independent SRS configuration may be selected for the first cell. For example, at block 435, an SRS transmission may be dropped or scaled on the first cell.

If a UE 115 is also power limited with respect to a second cell as determined at block 430, an SRS configuration may be selected for each cell, and SRS transmissions may be dropped or scaled on both the first cell and on the second cell at block 440 based on the power limitations.

Figure 4B:
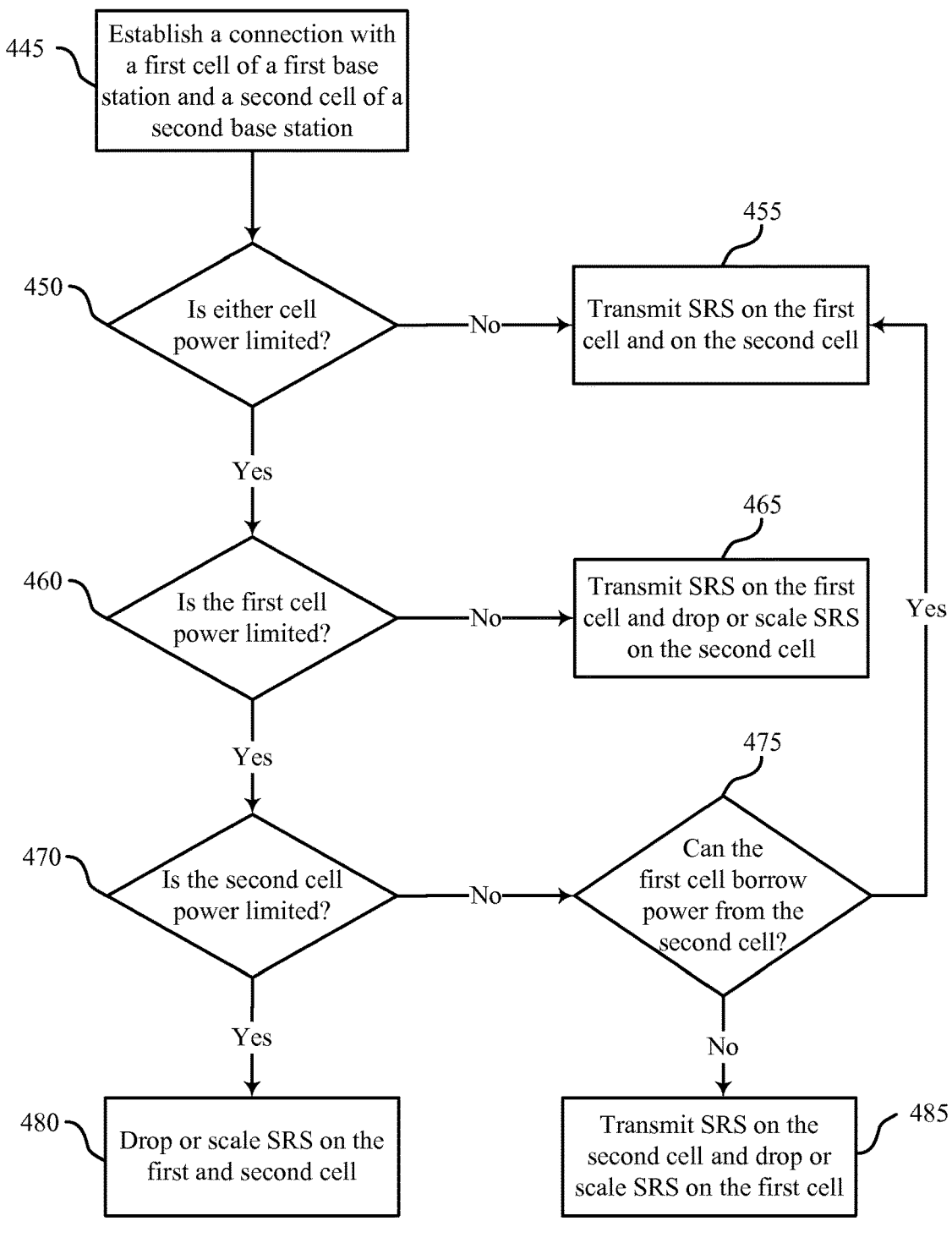
FIG. 4B shows a flowchart illustrating an example of a method for transmitting or prioritizing SRS in a dual connectivity scenario, in accordance with the present disclosure.

FIG. 4B shows a flowchart illustrating an example of a method of wireless communication 402 for transmitting or prioritizing SRS transmissions in a dual connectivity scenario, in accordance with the present disclosure. FIG. 4B may illustrate an example of how SRS transmission, dropping, or scaling may be done independently for cells associated with different base stations 105 using power borrowing. Power borrowing may refer to using power initially allocated for transmissions on a first cell to be used for transmissions on a second cell. For example, a UE 115 may be power limited with respect to a first cell but not power limited with respect to a second cell. Further, the power allocated or available for transmissions on the second cell may be enough such that there is sufficient power for the transmission on the second cell as well as surplus power that can be used, or "borrowed," for transmission on the first cell. For example, at block 445, a UE 115 may establish a connection with a first cell of a first base station 105 and a second cell of a second base station 105 using dual connectivity procedures. At block 450, the UE 115 may determine whether it is power limited on any of the cells. If not, at block 455, UE 115 may select an SRS configuration in which an SRS may be transmitted on the first cell and on the second cell without power scaling. However, even if UE 115 is not power limited on any cell, in some cases an SRS may not be scheduled. Thus, an SRS is transmitted if it is scheduled.

If a UE 115 is power limited with respect to at least one cell, at block 460 UE 115 may determine whether it is power limited for the first cell. In some cases, the UE 115 may be power limited for the first cell based on a power limitation for transmissions to the first base station 105. If not, the UE 115 may be power limited for the second cell and at block 465 the UE 115 may select an SRS configuration in which SRS may be transmitted on the first cell and an independent SRS configuration may be selected for the second cell, based on which an SRS transmission may be dropped or scaled.

If a UE 115 is power limited with respect to a first cell, at block 470 the UE 115 may determine whether the second cell is also power limited. If the UE 115 is not power limited for the second cell, at block 475 the UE 115 may determine whether surplus power is available. For example, surplus power may be available from power that was originally allocated or made available for transmissions to a cell or base station 105 that is not power limited (i.e., power may be "borrowed" from the second cell for the first cell, allowing SRS transmission on both the first and second cell as depicted in block 455). In some cases, surplus power is power that has not been designated for transmitting on or to a particular cell or base station. If surplus power is available, in some cases that power may be used to overcome the power limitation of the first cell (e.g., the power may be "borrowed" by the first cell). In this case, according to block 455, UE 115 may select an SRS configuration in which an SRS may be transmitted on the first cell and on the second cell despite the initial determination that the UE 115 was power limited for the first cell. If the UE 115 is power limited for the second cell, at block 470, the UE 115 may, at block 480, drop or scale power on the first and second cell. In some cases, a second cell may also borrow power to overcome a power limitation of the UE with respect to the second cell (e.g., the role of the first cell and the second cell as depicted in method 402 may be reversed).

If sufficient power is not available to overcome the power limitation of the first cell, at block 485, UE 115 may select an SRS configuration in which SRS may be transmitted on the second cell and an independent SRS configuration may be selected for the first cell based on which an SRS transmission may be dropped or scaled on the first cell.

If a UE 115 is also power limited with respect to a second cell, an SRS configuration may be selected for each cell based on which SRS transmissions may be dropped or scaled on both the first cell and on the second cell at block 480. Thus, a base station may perform power scaling if both the first cell and the second cell are power limited and UE 115 is power limited across all cells.

Figure 5:
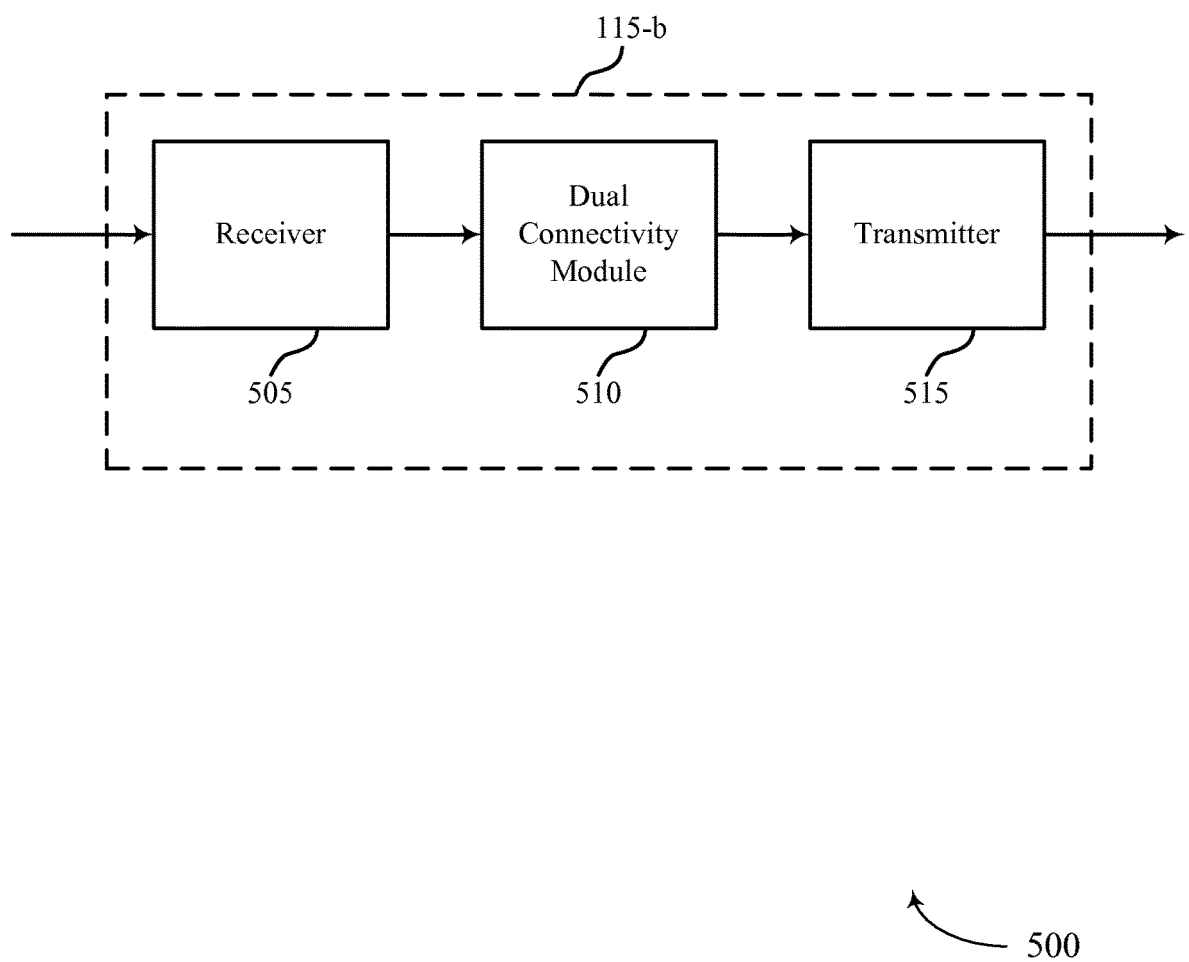
FIG. 5 shows a block diagram of a device that supports transmitting or prioritizing SRS in a dual connectivity scenario, in accordance with the present disclosure.

FIG. 5 shows a block diagram 500 of a UE 115-*b* that supports transmitting and/or prioritizing SRS transmissions in a dual connectivity scenario in accordance with various examples. The UE 115-*b* may be an example of one or more aspects of a UE 115 described with reference to FIGS. 1-2 and may incorporate aspects of the methods and systems described with reference to FIGS. 3-4. The UE 115-*b* may include a receiver 505, a dual connectivity module 510, and a transmitter 515. The UE 115-*b* may also include a processor. Each of these components may be in communication with one another. The UE 115-*b* may be configured to implement the methods 401 or 402 described with reference to FIGS. 4A and 4B.

The components of the UE 115-*b* may, individually or collectively, be implemented with at least one application specific integrated circuit (ASIC) adapted to perform some or all of the applicable functions in hardware. Alternatively, the functions may be performed by one or more other processing units (or cores), on at least one IC. In other examples, other types of integrated circuits may be used (e.g., Structured/Platform ASICs, a field programmable gate array (FPGA), or another Semi-Custom IC), which may be programmed in any manner known in the art. The functions of each unit may also be implemented, in whole or in part, with instructions embodied in a memory, formatted to be executed by one or more general or application-specific processors.

The receiver 505 may receive information such as packets, user data, and/or control information associated with various information channels (e.g., control channels, data channels, etc.). Information may be passed on to the dual connectivity module 510, and to other components of the UE 115-*b*.

The dual connectivity module 510 may be configured to establish a concurrent connection with a first cell of a first base station and a second cell of a second base station. The dual connectivity module 510 may also be configured to determine that the UE 115-*b* is in a power limited state for the first cell for a time period, and to determine that the UE 115-*b* is not in a power limited state for the second cell for the time period. The dual connectivity module 510 may be configured to transmit an SRS to the second base station on the second cell based at least in part on the determination that the UE 115-*b* is not in a power limited state for the second cell for the time period. The dual connectivity module 510 may also be configured to borrow power from the second cell for transmission of SRS on the first cell, despite the fact that the UE 115-*b* is in a power limited state for the first cell.

The transmitter 515 may transmit the one or more signals received from other components of the UE 115-*b*. For example, transmitter 515 may be configured to transmit SRS, PUCCH, and PUSCH transmissions. In some examples, the transmitter 515 may be collocated with the receiver 505 in a transceiver module. The transmitter 515 may include a single antenna, or it may include a plurality of antennas.

Figure 6:
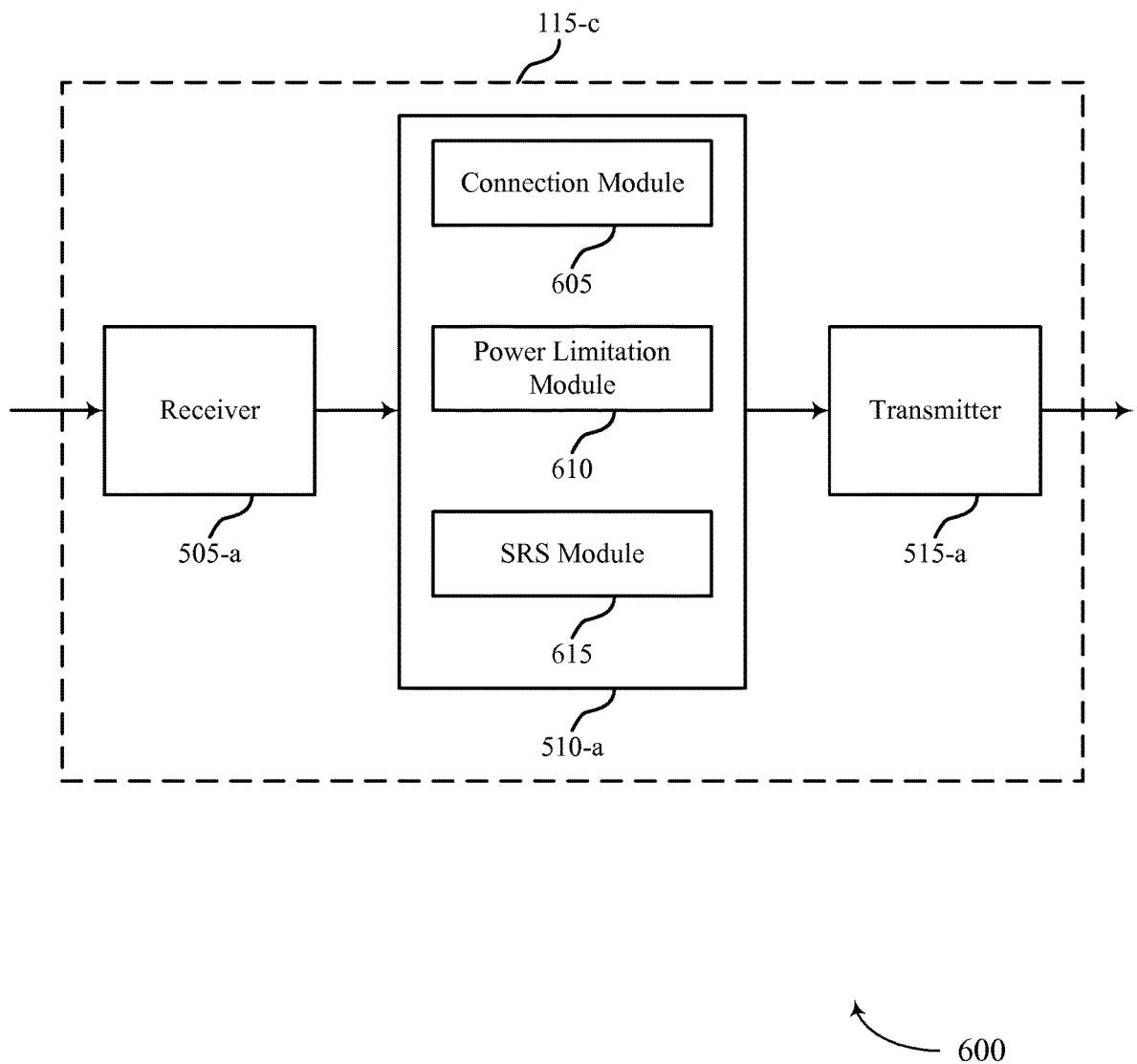
FIG. 6 shows a block diagram of a device that supports transmitting or prioritizing SRS in a dual connectivity scenario, in accordance with the present disclosure.

FIG. 6 shows a block diagram 600 of a UE 115-*c* that supports transmitting or prioritizing SRS transmissions in a dual connectivity scenario in accordance with various examples. The UE 115-*c* may be an example of one or more aspects of a UE 115 described with reference to FIGS. 1-5.

The UE 115-c may include a receiver 505-a, a dual connectivity module 510-a, and/or a transmitter 515-a. The UE 115-c may also include a processor. Each of these components may be in communication with one another. The dual connectivity module 510-a may also include a connection module 605, a power limitation module 610, and an SRS module 615.

The components of the UE 115-c may, individually or collectively, be implemented with one or more ASICs adapted to perform some or all of the applicable functions in hardware. Alternatively, the functions may be performed by one or more other processing units (or cores), on an IC. In other examples, other types of integrated circuits may be used (e.g., Structured/Platform ASICs, an FPGA, or another Semi-Custom IC), which may be programmed in any manner known in the art. The functions of each unit may also be implemented, in whole or in part, with instructions embodied in a memory, formatted to be executed by one or more general or application-specific processors.

The receiver 505-a may receive information which may be passed on to the dual connectivity module 510-a, and to other components of the UE 115-c. The dual connectivity module 510-a may be configured to perform the operations described above with reference to FIG. 5. The transmitter 515-a may transmit the one or more signals received from other components of the UE 115-c.

The connection module 605 may be configured to establish a concurrent connection with a first cell of a first base station 105 and a second cell of a second base station 105. In some cases, the first base station 105 and the second base station 105 may be connected to each other with a non-ideal backhaul link 134. In some examples, the first base station 105 may be a master base station (e.g., for the MCG) and the second base station 105 may be a secondary base station (e.g., for the SCG).

The power limitation module 610 may be configured to determine whether the UE 115-c is in a power limited state for the first cell for a time period. The power limitation module 610 may also be configured to determine whether the UE 115-c is in a power limited state for the second cell for the time period. In some examples, determining that the UE may be in the power limited state may be include analyzing overlapping channels for a symbol period (e.g., the time period). The power limitation module 610 may also be configured to determine that the first cell or the second cell is in a power limited state for the time period based on a first scheduled transmission or the second scheduled transmission.

The SRS module 615 may be configured to transmit an SRS to the second base station on the second cell based, wholly or partially, on the determination that the UE is not in a power limited state for the second cell for the time period. In some examples, the first cell may be in a first timing adjustment group (TAG) and the second cell in a second TAG.

Figure 7:
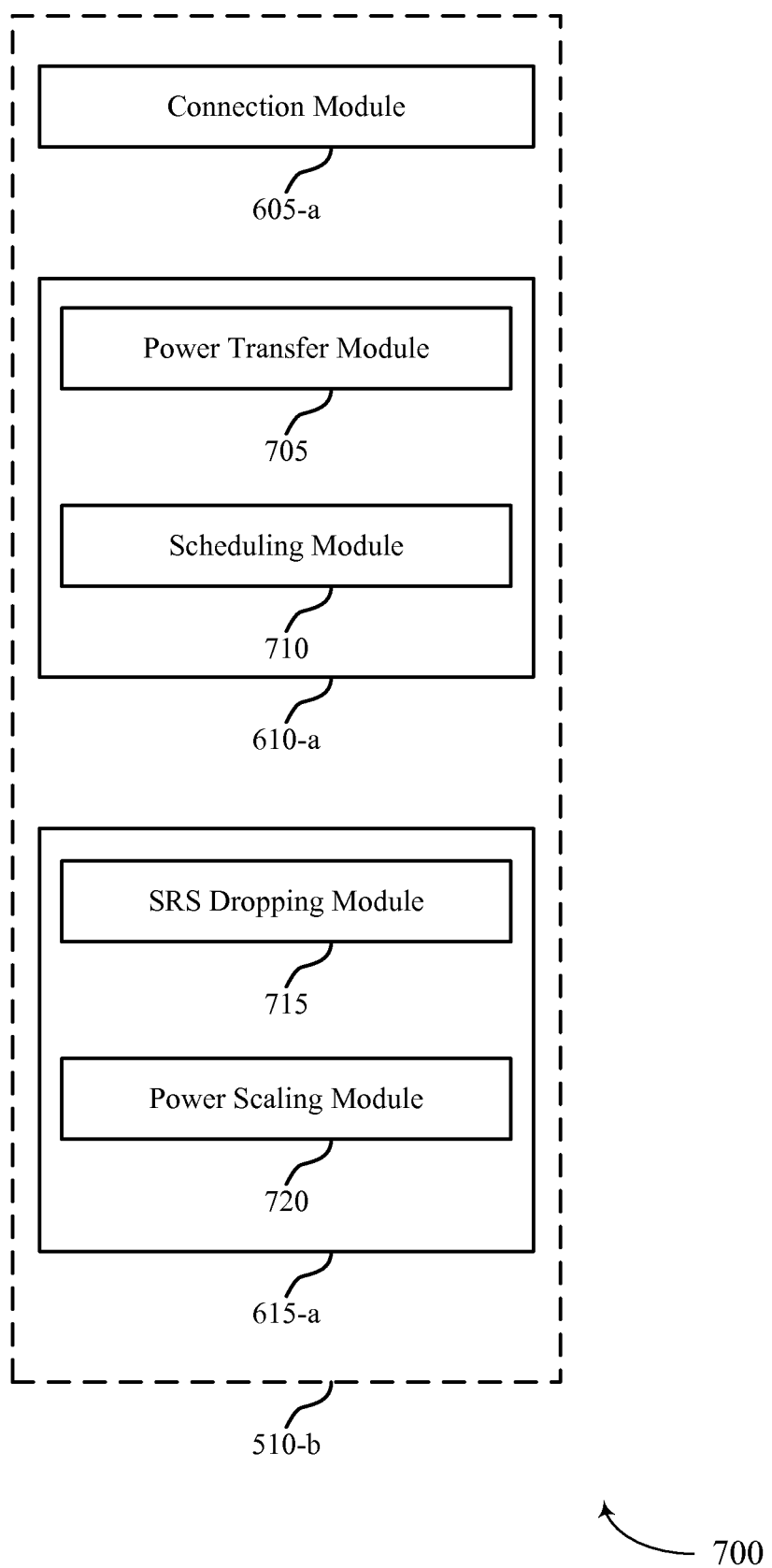
FIG. 7 shows a block diagram of a device that supports transmitting or prioritizing SRS in a dual connectivity scenario, in accordance with the present disclosure.

FIG. 7 shows a block diagram 700 of a dual connectivity module 510-b that supports transmitting or prioritizing SRS transmissions in a dual connectivity scenario, in accordance with the present disclosure. The dual connectivity module 510-b may be an example of one or more aspects of a dual connectivity module 510 described with reference to FIGS. 5-6. The dual connectivity module 510-b may include a connection module 605-a, a power limitation module 610-a, and an SRS module 615-a. Each of these modules may perform the functions described above with reference to FIG. 6. The power limitation module 610-a may also include a power transfer module 705, and a scheduling module 710.

The SRS module 615-a may also include an SRS dropping module 715, and a power scaling module 720.

The components of the dual connectivity module 510-b may, individually or collectively, be implemented with at least one ASIC adapted to perform some or all of the applicable functions in hardware. Alternatively, the functions may be performed by one or more other processing units (or cores), on an IC or ICs. In other examples, other types of integrated circuits may be used (e.g., Structured/Platform ASICs, an FPGA, or another Semi-Custom IC), which may be programmed in any manner known in the art. The functions of each unit may also be implemented, in whole or in part, with instructions embodied in a memory, formatted to be executed by one or more general or application-specific processors.

The power transfer module 705 may be configured to decide whether to borrow surplus power for allocation to the first cell. The power transfer module 705 may also be configured to determine that an amount of surplus power is sufficient to overcome the power limited state for the first cell. The power transfer module 705 may, in some examples, be configured to transmit an SRS to the first base station on the first cell in the time period based on the determination that the amount of surplus power is sufficient to overcome the power limited state for the first cell (e.g., in coordination with a transmitter 515). Additionally or alternatively, the power transfer module 705 may be configured to determine that an amount of surplus power is insufficient to overcome the power limited state for the first cell. In some cases, the power transfer module 705 is configured to drop or scale an SRS transmission to the first base station in the time period based on the determination that the amount of surplus power is insufficient to overcome the power limited state for the first cell (e.g., in coordination with a SRS dropping module 715 or power scaling module 720). In some examples, the surplus power may be initially designated for transmissions to the second base station. Alternatively, the surplus power may not be designated for transmissions to a particular base station.

The scheduling module 710 may be configured to identify a first scheduled transmission for the first cell during a time period and a second scheduled transmission for the second cell during the time period. Then, scheduling module 710 may be configured to determine whether there is a transmission overlap during the period. For example, scheduling module may determine if the SRS and a PUCCH or a PUSCH transmission overlap in the same symbol period.

The SRS dropping module 715 may be configured to drop an SRS transmission for the first cell, which may be based on the determination that the UE 115 is in a power limited state on the first cell. The SRS dropping module 715 may also be configured to drop an SRS transmission, e.g., based on the power limited state. In some cases, power scaling for the SRS transmission is uniform across all cells.

The power scaling module 720 may be configured to scale a transmission power for the first cell, which may be based on the determination that the UE is in a power limited state on the first cell. The power scaling module 720 may also be configured to scale a transmission power for the first cell and a transmission power for the second cell, which may be based on the power limited state. In some cases, the transmission power for the first cell and the transmission power for the second cell are scaled by a same value.

Figure 8:
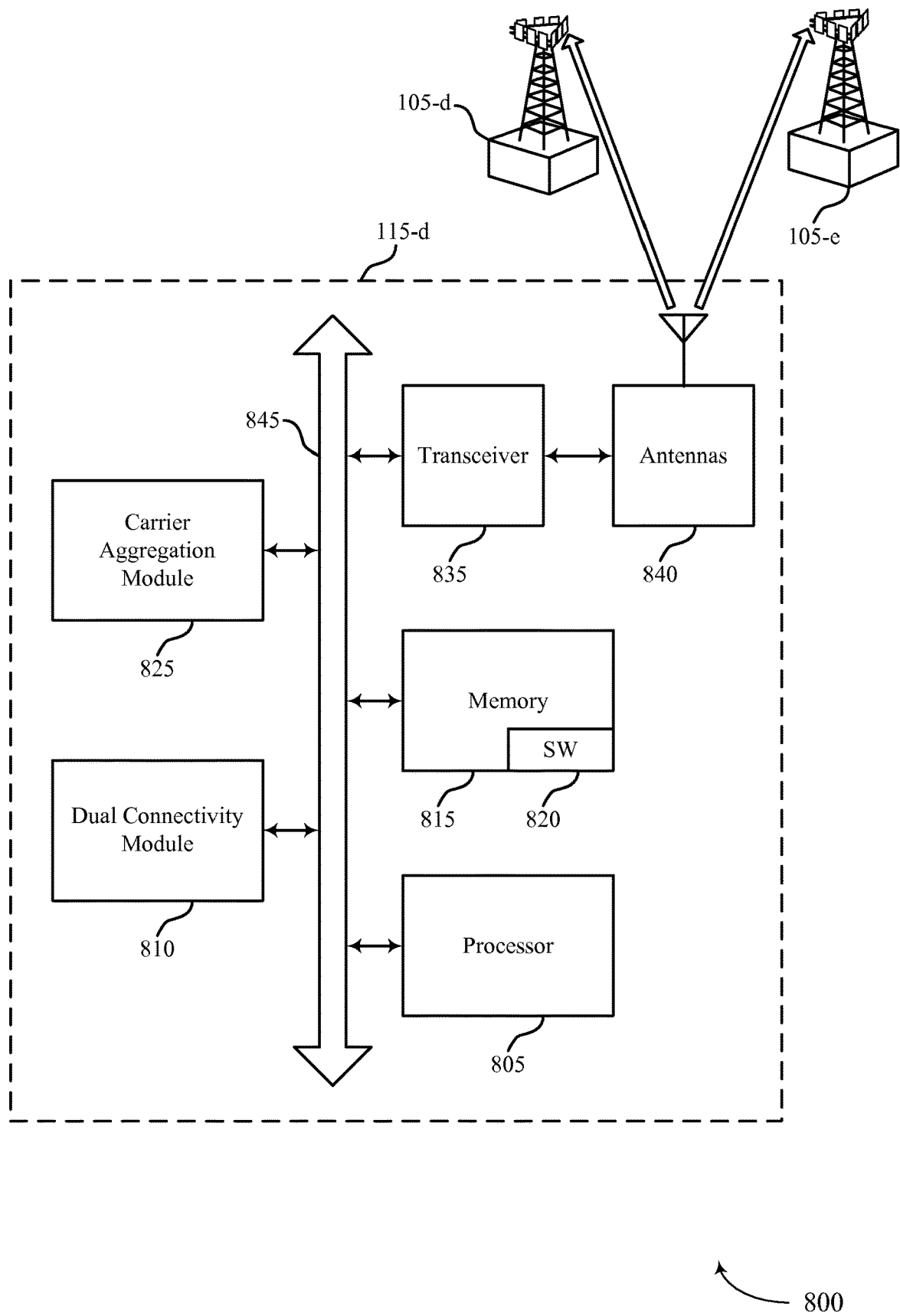
FIG. 8 illustrates a block diagram of a system that supports transmitting or prioritizing SRS in a dual connectivity scenario, in accordance with the present disclosure.

FIG. 8 shows a diagram of a system 800 that supports transmitting or prioritizing SRS transmissions in a dual connectivity scenario, in accordance with the present disclosure. System 800 may include a UE 115-d, which may be an example of a UE 115-*d* described with reference to FIGS. 1-7. The UE 115-*d* may include a dual connectivity module 810, which may be an example of a dual connectivity module described with reference to FIGS. 5-7. Additionally or alternatively, the UE 115-*d* may include a carrier aggregation module 825. The UE 115-*d* may also include components for bi-directional voice and data communications including components for transmitting communications and components for receiving communications.

Carrier aggregation module 825 may be capable of configuring UE 115-*d* for carrier aggregation. For example, carrier aggregation may be used when UE 115-*d* communicates with a base station 105 using more than one frequency range, or with multiple base stations (e.g., 105-*d* and 105-*e*) that have an ideal backhaul. If base stations 105-*d* and 105-*e* utilize a non-ideal backhaul, as discussed above, UE 115-*d* may utilize dual connectivity rather than carrier aggregation.

The UE 115-*d* may include a processor module 805, and memory 815 (including software (SW) 820), a transceiver module 835, and one or more antenna(s) 840, which each may communicate, directly or indirectly, with one another (e.g., via one or more buses 845). The transceiver module 835 may be configured to communicate bi-directionally, via the antenna(s) 840 or one or more wired or wireless links, with one or more networks, as described above. For example, the transceiver module 835 may be configured to communicate bi-directionally with a base station 105. The transceiver module 835 may include a modem configured to modulate the packets and provide the modulated packets to the antenna(s) 840 for transmission, and to demodulate packets received from the antenna(s) 840. While the UE 115-*d* may include a single antenna 840, the UE 115-*d* may also have multiple antennas 840 capable of concurrently transmitting or receiving multiple wireless transmissions. The transceiver module 835 may also be capable of concurrently communicating with one or more base stations 105.

The memory 815 may include random access memory (RAM) and read only memory (ROM). The memory 815 may store computer-readable, computer-executable software/firmware code 820 containing instructions that are configured to, when executed, cause the processor module 805 to perform various functions described herein (e.g., determining whether the UE 115-*d* is power limited for a cell, transmitting, dropping, or scaling an SRS, borrowing power, etc.). Alternatively, the software/firmware code 820 may not be directly executable by the processor module 805 but be configured to cause a computer (e.g., when compiled and executed) to perform functions described herein. The processor module 805 may include an intelligent hardware device, e.g., a central processing unit (CPU), a microcontroller, an ASIC, etc.

Figure 9:
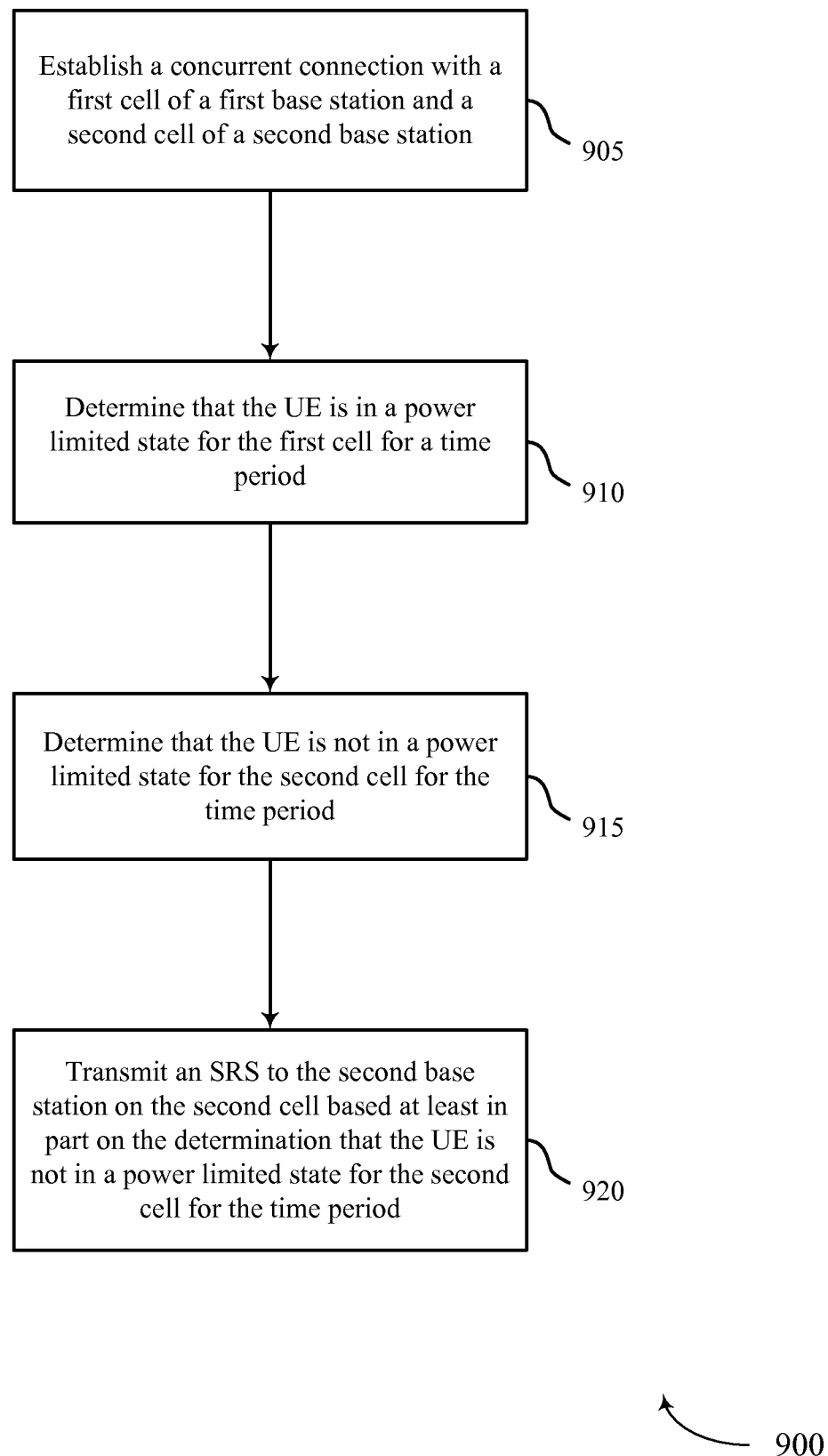
FIG. 9 shows a flowchart illustrating a method for transmitting or prioritizing SRS in a dual connectivity scenario, in accordance with the present disclosure.

FIG. 9 shows a flowchart 900 illustrating a method for transmitting or prioritizing SRS transmissions in a dual connectivity scenario, in accordance with the present disclosure. The functions of flowchart 900 may be implemented by a UE 115 or its components as described with reference to FIGS. 1-8. In certain examples, the blocks of the flowchart 900 may be performed by the dual connectivity module as described with reference to FIGS. 5-8.

At block 905, the UE 115 may establish a concurrent connection with a first cell of a first base station 105 and a second cell of a second base station 105. In certain examples, the functions of block 905 may be performed by the connection module 605 as described above with reference to FIG. 6.

At block 910, the UE 115 may determine that the UE is in a power limited state for the first cell for a time period. In certain examples, the functions of block 910 may be performed by the power limitation module 610 as described above with reference to FIG. 6.

At block 915, the UE 115 may determine that the UE is not in a power limited state for the second cell for the time period. In certain examples, the functions of block 915 may be performed by the power limitation module 610 as described above with reference to FIG. 6.

At block 920, the UE 115 may transmit an SRS to the second base station on the second cell based at least in part on the determination that the UE is not in a power limited state for the second cell for the time period. In certain examples, the functions of block 920 may be performed by the SRS module 615 as described above with reference to FIG. 6.

Figure 10:
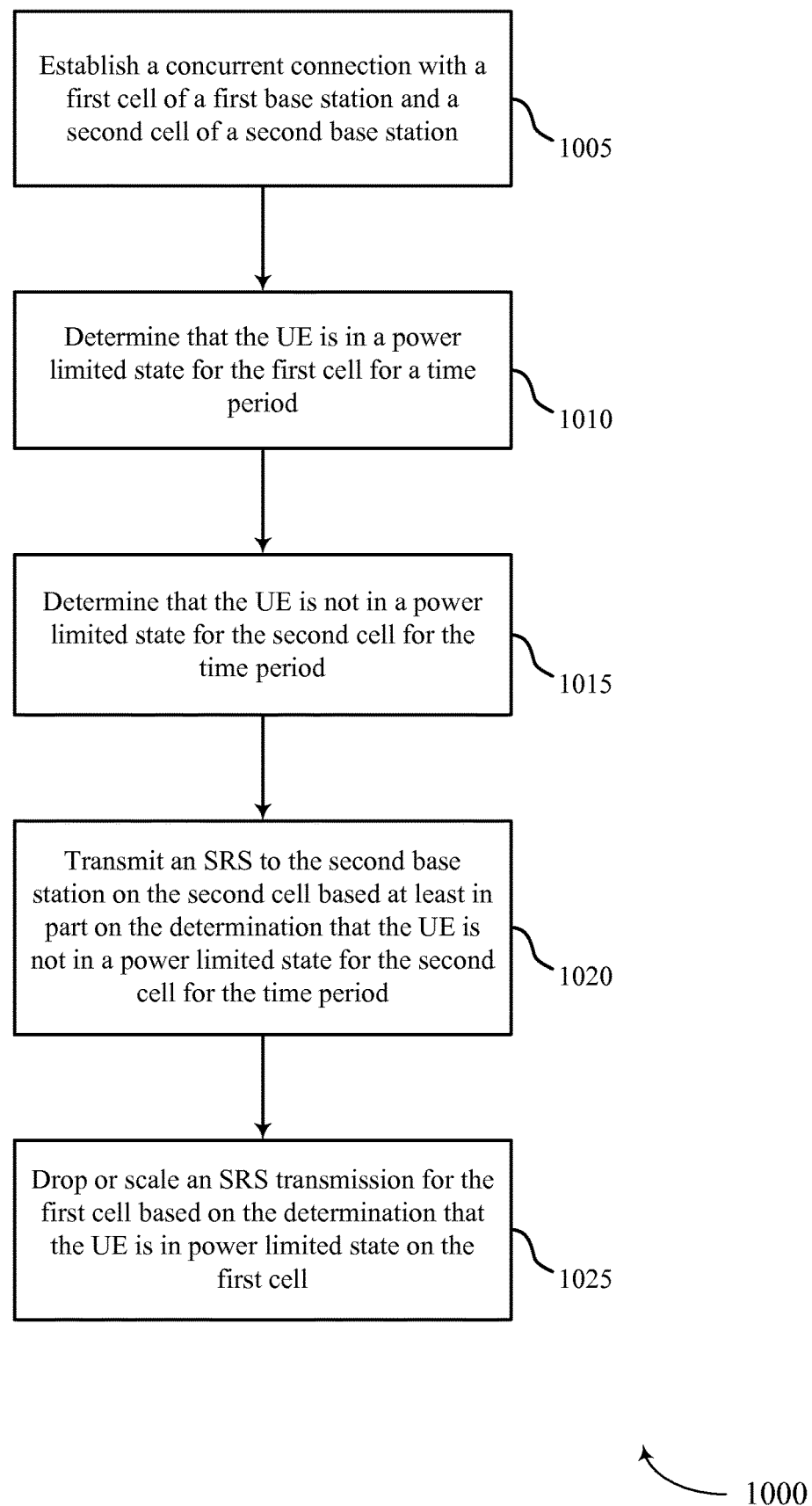
FIG. 10 shows a flowchart illustrating a method for transmitting or prioritizing SRS in a dual connectivity scenario, in accordance with the present disclosure.

FIG. 10 shows a flowchart 1000 illustrating a method for transmitting and/or prioritizing SRS transmissions in a dual connectivity scenario in accordance with various examples. The functions of flowchart 1000 may be implemented by a UE 115 or its components as described with reference to FIGS. 1-8. In certain examples, the blocks of the flowchart 1000 may be performed by the dual connectivity module, as described with reference to FIGS. 5-8. The method described in flowchart 1000 may also incorporate aspects of flowchart 900 of FIG. 9.

At block 1005, the UE 115 may establish a concurrent connection with a first cell of a first base station 105 and a second cell of a second base station 105. In certain examples, the functions of block 1005 may be performed by the connection module 605 as described above with reference to FIG. 6.

At block 1010, the UE 115 may determine that the UE is in a power limited state for the first cell for a time period. In certain examples, the functions of block 1010 may be performed by the power limitation module 610 as described above with reference to FIG. 6.

At block 1015, the UE 115 may determine that the UE is not in a power limited state for the second cell for the time period. In certain examples, the functions of block 1015 may be performed by the power limitation module 610 as described above with reference to FIG. 6.

At block 1020, the UE 115 may transmit an SRS to the second base station on the second cell based at least in part on the determination that the UE is not in a power limited state for the second cell for the time period. In certain examples, the functions of block 1020 may be performed by the SRS module 615 as described above with reference to FIG. 6.

At block 1025, the UE 115 may drop or scale an SRS transmission for the first cell based on the determination that the UE is in a power limited state on the first cell. In certain examples, the functions of block 1025 may be performed by the SRS dropping module 715 or power scaling module 720 as described above with reference to FIG. 7.

Figure 11:
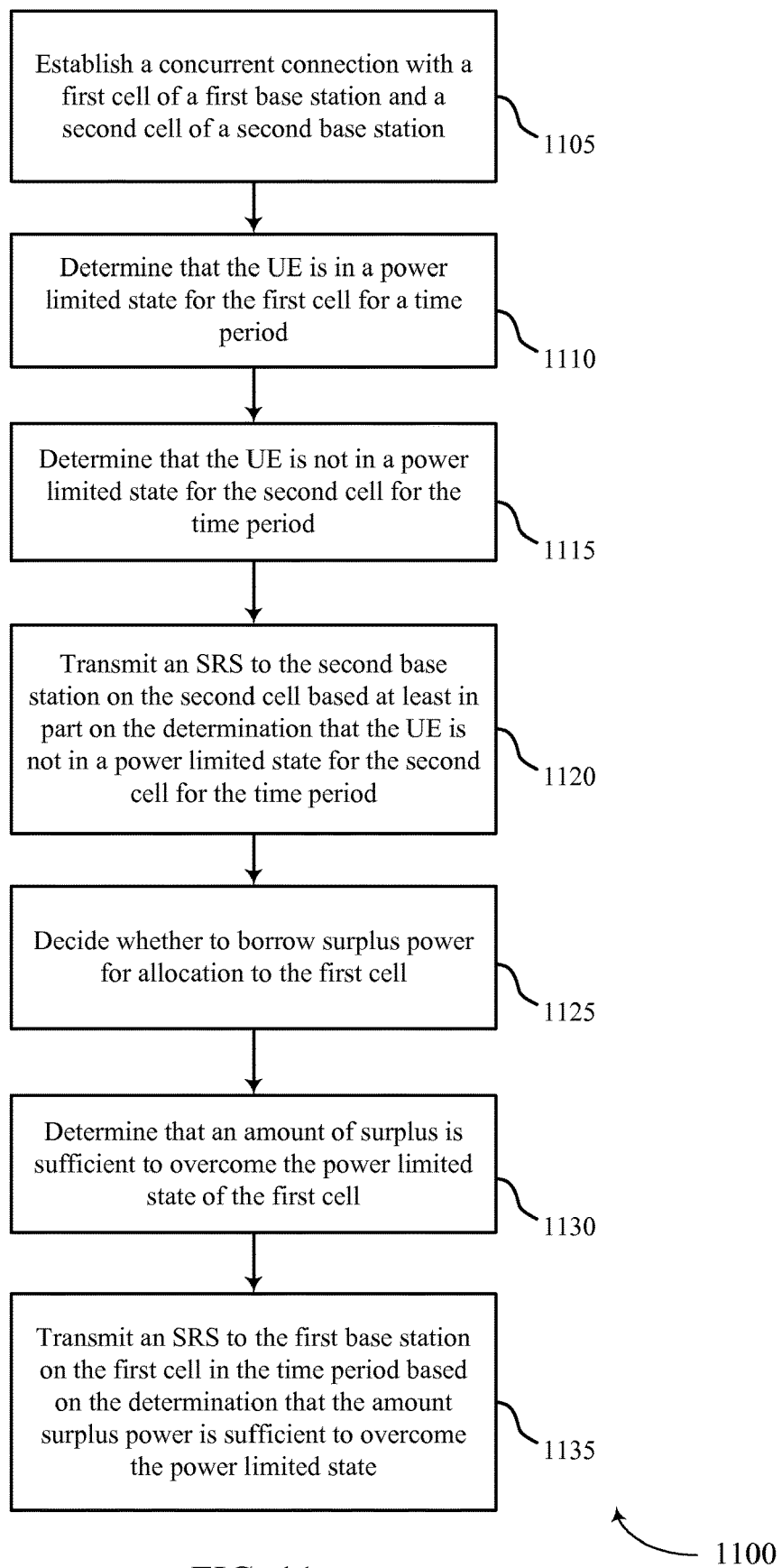
FIG. 11 shows a flowchart illustrating a method for transmitting or prioritizing SRS in a dual connectivity scenario, in accordance with the present disclosure.

FIG. 11 shows a flowchart 1100 illustrating a method for transmitting and/or prioritizing SRS transmissions in a dual connectivity scenario, in accordance with various examples. The functions of flowchart 1100 may be implemented by a UE 115 or its components as described with reference to FIGS. 1-8. In certain examples, the blocks of the flowchart 1100 may be performed by the dual connectivity module as described with reference to FIGS. 5-8. The method described in flowchart 1100 may also incorporate aspects of flowcharts 900 to 1000 of FIGS. 9-10.

At block 1105, the UE 115 may establish a concurrent connection with a first cell of a first base station 105 and a second cell of a second base station 105. In certain examples, the functions of block 1105 may be performed by the connection module 605 as described above with reference to FIG. 6.

At block 1110, the UE 115 may determine that the UE is in a power limited state for the first cell for a time period. In certain examples, the functions of block 1110 may be performed by the power limitation module 610 as described above with reference to FIG. 6.

At block 1115, the UE 115 may determine that the UE is not in a power limited state for the second cell for the time period. In certain examples, the functions of block 1115 may be performed by the power limitation module 610 as described above with reference to FIG. 6.

At block 1120, the UE 115 may transmit an SRS to the second base station on the second cell based at least in part on the determination that the UE is not in a power limited state for the second cell for the time period. In certain examples, the functions of block 1120 may be performed by the SRS module 615 as described above with reference to FIG. 6.

At block 1125, the UE 115 may decide whether to borrow surplus power for allocation to the first cell. In certain examples, the functions of block 1125 may be performed by the power transfer module 705 as described above with reference to FIG. 7.

At block 1130, the UE 115 may determine that an amount of surplus power is sufficient to overcome the power limited state for the first cell. In certain examples, the functions of block 1130 may be performed by the power transfer module 705 as described above with reference to FIG. 7.

At block 1135, the UE 115 may transmit an SRS to the first base station on the first cell in the time period based on the determination that the amount of surplus power is sufficient to overcome the power limited state for the first cell. In certain examples, the functions of block 1135 may be performed by the power transfer module 705 as described above with reference to FIG. 7.

Figure 12:
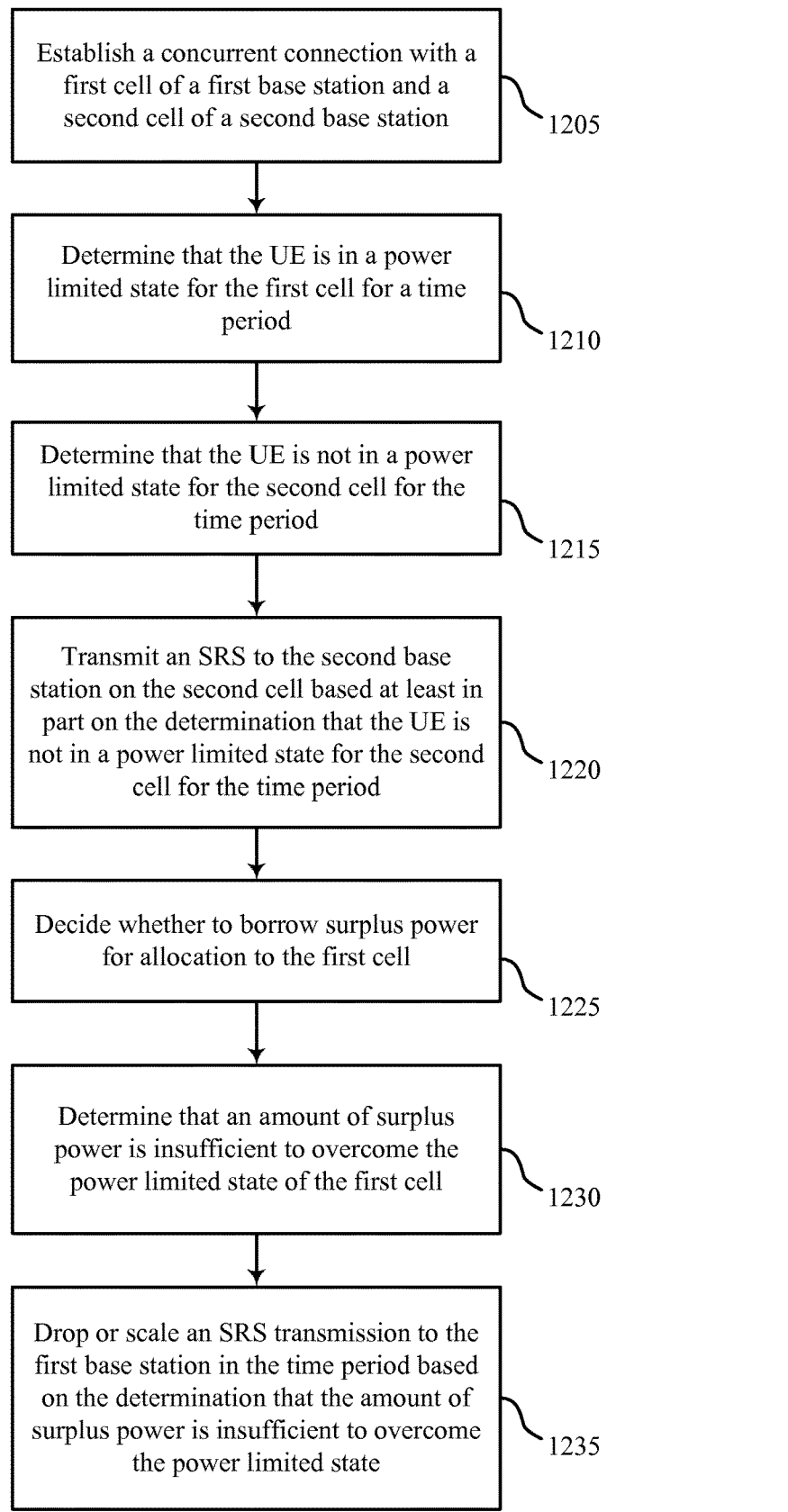
FIG. 12 shows a flowchart illustrating a method for transmitting or prioritizing SRS in a dual connectivity scenario, in accordance with the present disclosure.

FIG. 12 shows a flowchart 1200 illustrating a method for transmitting and/or prioritizing SRS transmissions in a dual connectivity scenario, in accordance with various examples. The functions of flowchart 1200 may be implemented by a UE 115 or its components as described with reference to FIGS. 1-8. In certain examples, the blocks of the flowchart 1200 may be performed by the dual connectivity module as described with reference to FIGS. 5-8. The method described in flowchart 1200 may also incorporate aspects of flowcharts 900 to 1100 of FIGS. 9-11.

At block 1205, the UE 115 may establish a concurrent connection with a first cell of a first base station 105 and a second cell of a second base station 105. In certain examples, the functions of block 1205 may be performed by the connection module 605 as described above with reference to FIG. 6.

At block 1210, the UE 115 may determine that the UE is in a power limited state for the first cell for a time period. In certain examples, the functions of block 1210 may be performed by the power limitation module 610 as described above with reference to FIG. 6.

At block 1215, the UE 115 may determine that the UE is not in a power limited state for the second cell for the time period. In certain examples, the functions of block 1215 may be performed by the power limitation module 610 as described above with reference to FIG. 6.

At block 1220, the UE 115 may transmit an SRS to the second base station on the second cell based at least in part on the determination that the UE is not in a power limited state for the second cell for the time period. In certain examples, the functions of block 1220 may be performed by the SRS module 615 as described above with reference to FIG. 6.

At block 1225, the UE 115 may decide whether to borrow surplus power for allocation to the first cell. In certain examples, the functions of block 1225 may be performed by the power transfer module 705 as described above with reference to FIG. 7.

At block 1230, the UE 115 may determine that an amount of surplus power is insufficient to overcome the power limited state for the first cell. In certain examples, the functions of block 1230 may be performed by the power transfer module 705 as described above with reference to FIG. 7.

At block 1235, the UE 115 may drop or scale an SRS transmission to the first base station in the time period based on the determination that the amount of surplus power is insufficient to overcome the power limited state for the first cell. In certain examples, the functions of block 1235 may be performed by the power transfer module 705 as described above with reference to FIG. 7.

Figure 13:
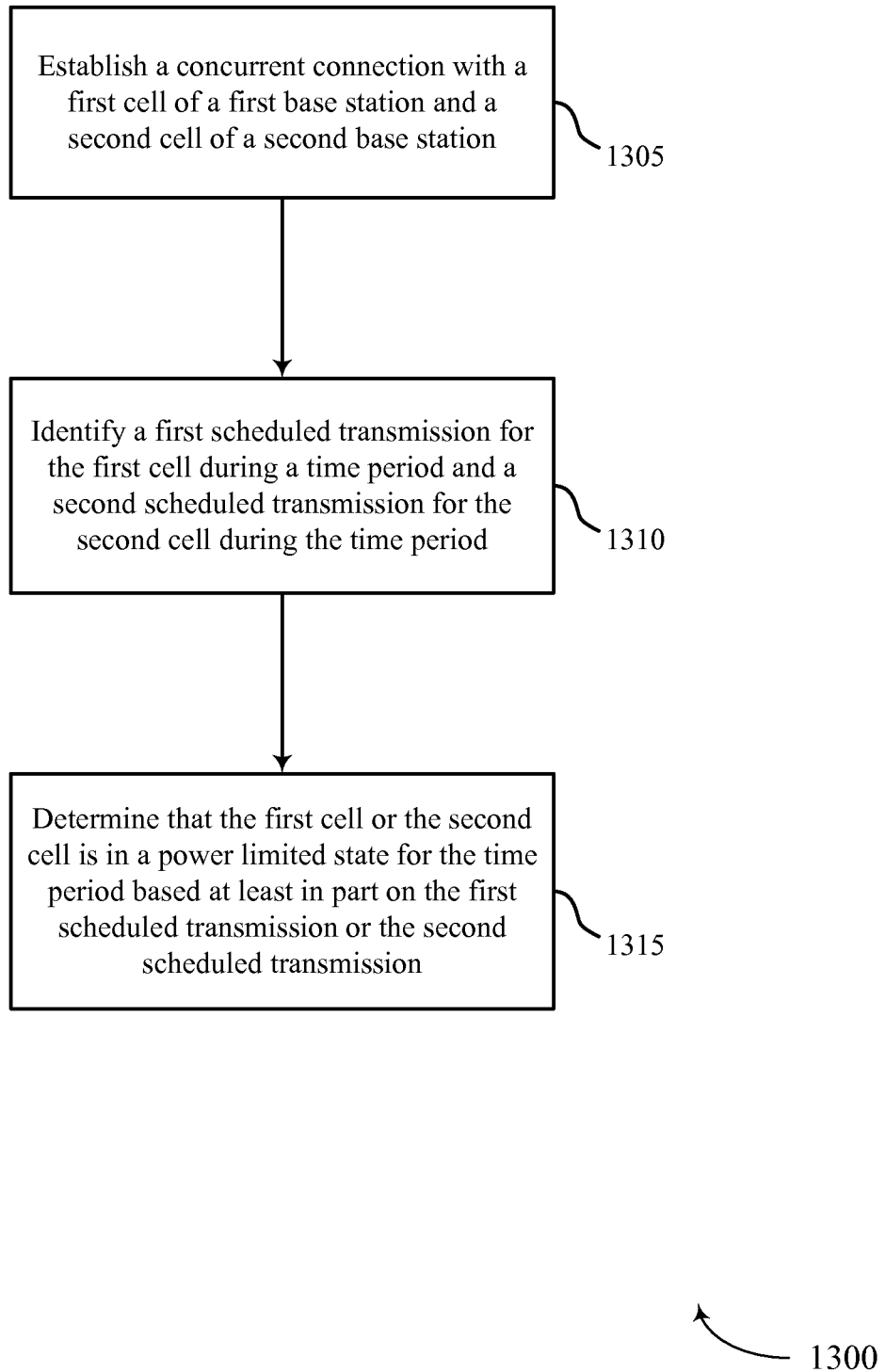
FIG. 13 shows a flowchart illustrating a method for transmitting or prioritizing SRS in a dual connectivity scenario, in accordance with the present disclosure.

FIG. 13 shows a flowchart 1300 illustrating a method for transmitting and/or prioritizing SRS transmissions in a dual connectivity scenario, in accordance with various examples. The functions of flowchart 1300 may be implemented by a UE 115 or its components as described with reference to FIGS. 1-8. In certain examples, the blocks of the flowchart 1300 may be performed by the dual connectivity module as described with reference to FIGS. 5-8.

At block 1305, the UE 115 may establish a concurrent connection with a first cell of a first base station 105 and a second cell of a second base station 105. In certain examples, the functions of block 1305 may be performed by the connection module 605 as described above with reference to FIG. 6.

At block 1310, the UE 115 may identify a first scheduled transmission for the first cell during a time period and a second scheduled transmission for the second cell during the time period. In certain examples, the functions of block 1310 may be performed by the scheduling module 710 as described above with reference to FIG. 7.

At block 1315, the UE 115 may determine that the first cell or the second cell is in a power limited state for the time period based at least in part on the first scheduled transmission or the second scheduled transmission. The UE 115 may drop or scale an SRS transmission for one or both cells upon determining that either cell is in a power limited state. In some cases, the scaling is uniform across all cells. In certain examples, the functions of block 1315 may be performed by the power limitation module 610 as described above with reference to FIG. 6.

It should be noted that the method of flowcharts 900, 1000, 1100, 1200, and 1300 are just example implementations and that the operations of the method, and the steps may be rearranged or otherwise modified such that other implementations are possible.

The detailed description set forth above in connection with the appended drawings describes example embodiments and does not represent the only embodiments that may be implemented or that are within the scope of the claims. The term "exemplary" or "example" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates a disjunctive list such that, for example, a list of at least one of A, B, or C means A or B or C or AB or AC or BC or ABC (i.e., A and B and C).

Computer-readable media includes both non-transitory computer storage media and communication media including any non-transitory medium that facilitates transfer of a computer program from one place to another. A non-transitory storage medium may be any available medium that can be accessed by a general purpose or special purpose computer. By way of example, and not limitation, a non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a non-transitory computer-readable medium. For example, if the software is transmitted from a website, server, or other remote source using a coaxial cable, fiber optic cable, twisted pair, digital subscriber line (DSL), then the coaxial cable, fiber optic cable, twisted pair, or DSL are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of non-transitory computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description herein, although the techniques are applicable beyond LTE applications.

What is claimed is:

1. A method of wireless communication at a user equipment (UE), comprising:
    establishing a concurrent connection with a first cell of a first base station and a second cell of a second base station;
    identifying a first scheduled transmission on the first cell for a symbol period and a second scheduled transmission on the second cell for the symbol period;

initially allocating a first power for the first scheduled transmission on the first cell and a second power for the second scheduled transmission on the second cell;

determining, based at least in part on the initially allocated first power and a first maximum transmission power for the first cell, that the UE is in a power limited state for the first cell for the symbol period, wherein the first maximum transmission power for the first cell is less than a maximum transmission power for the concurrent connection of the UE, and a combination of the initially allocated first power and the initially allocated second power is less than the maximum transmission power for the concurrent connection of the UE for the symbol period;

determining, based at least in part on the initially allocated second power and a second maximum transmission power for the second cell, that the UE is not in a power limited state for the second cell for the symbol period, wherein the second maximum transmission power for the second cell is less than the maximum transmission power for the concurrent connection of the UE;

determining to allocate surplus power for transmission on the first cell for the symbol period, wherein the surplus power comprises a difference in power between the initially allocated second power for the second cell and the second maximum transmission power for the second cell; and transmitting a sounding reference signal (SRS) to the second base station on the second cell in the symbol period based at least in part on the determination that the UE is not in the power limited state for the second cell for the symbol period.

2. The method of claim 1, further comprising:
dropping an SRS transmission for the first cell for the symbol period based on the determination that the UE is in the power limited state for the first cell for the symbol period.

3. The method of claim 1, further comprising:
scaling the first power for the first cell for the symbol period based on the determination that the UE is in the power limited state for the first cell for the symbol period.

4. The method of claim 1, further comprising:
determining that an amount of the surplus power is sufficient to overcome the power limited state for the first cell; and
transmitting an SRS to the first base station on the first cell in the symbol period based on the determination that the amount of the surplus power is sufficient to overcome the power limited state for the first cell.

5. The method of claim 1, further comprising:
determining that an amount of the surplus power is insufficient to overcome the power limited state for the first cell; and
dropping or scaling an SRS transmission to the first base station in the symbol period based on the determination that the amount of the surplus power is insufficient to overcome the power limited state for the first cell.

6. The method of claim 1, wherein the first cell is in a first timing adjustment group (TAG) and the second cell is in a second TAG.

7. The method of claim 6, further comprising:
determining that an amount of the surplus power is sufficient to overcome the power limited state for the first cell; and
transmitting an SRS to the first base station on the first cell in the symbol period based at least in part on the determination that the amount of the surplus power is sufficient to overcome the power limited state for the first cell, wherein transmitting the SRS to the first base station on the first cell in the first TAG and transmitting the SRS to the second base station on the second cell in the second TAG is based at least in part on determining that the SRS transmissions are scheduled for a same symbol period in the first TAG and the second TAG.

8. The method of claim 1, wherein the first base station is a master base station and the second base station is a secondary base station.

9. The method of claim 1, wherein the surplus power comprises a portion of the difference in power between the initially allocated second power for the second cell and the maximum transmission power for the second cell.

10. The method of claim 1, further comprising:
determining that the first cell and the second cell are in a first timing adjustment group (TAG); and
dropping an SRS transmission to the first base station on the first cell in the symbol period based at least in part on determining that the first cell and the second cell are in the first TAG.

11. The method of claim 1, further comprising:
determining that the first cell is in a first timing advance group (TAG) and that the second cell is in a second TAG; and
transmitting an SRS transmission to the first base station on the first cell in the symbol period based at least in part on determining that the first cell is in the first TAG and the second cell is in the second TAG.

12. A method of wireless communication at a UE, comprising:
establishing a concurrent connection with a first cell of a first base station and a second cell of a second base station;
identifying a first scheduled transmission for the first cell during a symbol period and a second scheduled transmission for the second cell during the symbol period;
initially allocating a first power for the first scheduled transmission on the first cell and a second power for the second scheduled transmission on the second cell;
determining, based at least in part on the initially allocated first power and a first maximum transmission power for the first cell or the initially allocated second power and a second maximum transmission power for the second cell, that the first cell or the second cell is in a power limited state for the symbol period based at least in part on the first scheduled transmission or the second scheduled transmission, wherein the first maximum transmission power for the first cell is less than a maximum transmission power for the concurrent connection of the UE, the second maximum transmission power for the second cell is less than the maximum transmission power for the concurrent connection of the UE, and a combination of the initially allocated first power and the initially allocated second power is less than the maximum transmission power for the concurrent connection of the UE for the symbol period; and
determining to allocate surplus power for transmission on the first cell or the second cell for the symbol period, based at least in part on the determination that the first cell or the second cell is in the power limited state for the symbol period, wherein the surplus power comprises a difference in power between the initially allocated second power for the second cell and the second maximum transmission power for the second cell based at least in part on the first cell being power limited, or wherein the surplus power comprises a difference in power between the initially allocated first power for the first cell and the first maximum transmission power for the first cell based at least in part on the second cell being power limited.

13. The method of claim 12, further comprising:
dropping an SRS transmission for the symbol period based on the power limited state for the symbol period.

14. The method of claim 12, further comprising:
scaling the first power for the first cell and the second power for the second cell for the symbol period based on the power limited state for the symbol period, wherein the first power for the first cell and the second power for the second cell are scaled by a same value.

15. The method of claim 12, wherein the first cell is in a first timing adjustment group (TAG) and the second cell is in a second TAG.

16. The method of claim 12, wherein the first base station is a master base station and the second base station is a secondary base station.

17. An apparatus for wireless communication at a user equipment (UE), comprising:
a processor;
memory in electronic communication with the processor; and
instructions stored in the memory, the instructions being executable by the processor to cause the apparatus to:
establish a concurrent connection with a first cell of a first base station and a second cell of a second base station;
identify a first scheduled transmission on the first cell for a symbol period and a second scheduled transmission on the second cell for the symbol period;
initially allocate a first power for the first scheduled transmission on the first cell and a second power for the second scheduled transmission on the second cell;
determine, based at least in part on the initially allocated first power and a first maximum transmission power for the first cell, that the UE is in a power limited state for the first cell for the symbol period, wherein the first maximum transmission power for the first cell is less than a maximum transmission power for the concurrent connection of the UE, and a combination of the initially allocated first power and the initially allocated second power is less than the maximum transmission power the concurrent connection of the UE for the symbol period;
determine, based at least in part on the initially allocated second power and a second maximum transmission power for the second cell, that the UE is not in a power limited state for the second cell for the symbol period, wherein the second maximum transmission power for the second cell is less than the maximum transmission power for the concurrent connection of the UE;
determine to allocate surplus power for transmission on the first cell for the symbol period, wherein the surplus power comprises a difference in power between the initially allocated second power for the second cell and the second maximum transmission power for the second cell; and
transmit a sounding reference signal (SRS) to the second base station on the second cell in the symbol period based at least in part on the determination that the UE is not in the power limited state for the second cell for the symbol period.

18. The apparatus of claim 17, wherein the surplus power comprises a portion of the difference in power between the initially allocated second power for the second cell and the maximum transmission power for the second cell.

19. The apparatus of claim 17, the instructions being further executable by the processor to cause the apparatus to:
drop an SRS transmission for the first cell for the symbol period based on the determination that the UE is in the power limited state for the first cell for the symbol period.

20. The apparatus of claim 17, the instructions being further executable by the processor to cause the apparatus to:
scale the first power for the first cell for the symbol period based on the determination that the UE is in the power limited state for the first cell for the symbol period.

21. The apparatus of claim 17, the instructions being further executable by the processor to cause the apparatus to:
determine that an amount of the surplus power is sufficient to overcome the power limited state for the first cell; and
transmit an SRS to the first base station on the first cell in the symbol period based on the determination that the amount of the surplus power is sufficient to overcome the power limited state for the first cell.

22. The apparatus of claim 17, the instructions being further executable by the processor to cause the apparatus to:
determine that an amount of the surplus power is insufficient to overcome the power limited state for the first cell; and
drop or scale an SRS transmission to the first base station in the symbol period based on the determination that the amount of the surplus power is insufficient to overcome the power limited state for the first cell.

23. The apparatus of claim 17, wherein the first cell is in a first timing adjustment group (TAG) and the second cell is in a second TAG.

24. The apparatus of claim 17, wherein the first base station is a master base station and the second base station is a secondary base station.

25. An apparatus for wireless communication at a UE, comprising:
a processor;
memory in electronic communication with the processor; and
instructions stored in the memory, the instructions being executable by the processor to:
establish a concurrent connection with a first cell of a first base station and a second cell of a second base station;
identify a first scheduled transmission for the first cell during a symbol period and a second scheduled transmission for the second cell during the symbol period;
initially allocate a first power for the first scheduled transmission on the first cell and a second power for the second scheduled transmission on the second cell;
determine, based at least in part on the initially allocated first power and a first maximum transmission power for the first cell or the initially allocated second power and a second maximum transmission power for the second cell, that the first cell or the second cell is in a power limited state for the symbol period based at least in part on the first scheduled transmission or the second scheduled transmission, wherein the first maximum transmission power for the first cell is less than a maximum transmission power for the concurrent connection of the UE, the second maximum transmission power for the second cell is less than the maximum transmission power for the concurrent connection of the UE, and a combination of the initially allocated first power and the initially allocated second power is less than the maximum transmission power for the concurrent connection of the UE for the symbol period; and determine to allocate surplus power for transmission on the first cell or the second cell for the symbol period, based at least in part on determining that the first cell or the second cell is in the power limited state for the symbol period, wherein the surplus power comprises a difference in power between the initially allocated second power for the second cell and the second maximum transmission power for the second cell based at least in part on the first cell being power limited or the surplus power comprises a difference in power between the initially allocated first power for the first cell and the first maximum transmission power for the first cell based at least in part on the second cell being power limited.

26. The apparatus of claim 25, the instructions being further executable by the processor to:
drop an SRS transmission for the symbol period based on the power limited state for the symbol period.

27. The apparatus of claim 25, the instructions being further executable by the processor to:
scale the first power for the first cell and the second power for the second cell for the symbol period based on the power limited state, wherein the first power for the first cell and the second power for the second cell are scaled by a same value.

28. The apparatus of claim 25, wherein the first cell is in a first timing adjustment group (TAG) and the second cell is in a second TAG.

29. The apparatus of claim 25, wherein the first base station is a master base station and the second base station is a secondary base station.

* * * * *